(12) United States Patent
Gao et al.

(10) Patent No.: US 12,643,046 B2
(45) Date of Patent: Jun. 2, 2026

(54) VIRTUAL CHARACTER CONTROL METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Hao Gao, Shenzhen (CN); Lin Lin, Shenzhen (CN); Shanshan Qian, Shenzhen (CN); Haohui Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 326 days.

(21) Appl. No.: 18/214,306

(22) Filed: Jun. 26, 2023

(65) Prior Publication Data

US 2023/0330539 A1 Oct. 19, 2023

Related U.S. Application Data

(63) Continuation of application No. PCT/CN2022/125747, filed on Oct. 17, 2022.

(30) Foreign Application Priority Data

Nov. 18, 2021 (CN) .......................... 202111372101.8

(51) Int. Cl.
A63F 13/56 (2014.01)
A63F 13/52 (2014.01)

(52) U.S. Cl.
CPC .............. *A63F 13/56* (2014.09); *A63F 13/52* (2014.09)

(58) Field of Classification Search
CPC .................................. A63F 13/56; A63F 13/52
See application file for complete search history.

(56) References Cited

U.S. PATENT DOCUMENTS 6,966,837 B1 * 11/2005 Best ........................ A63F 13/52
463/32
8,062,110 B2 * 11/2011 Shimizu .................. A63F 13/42
463/2

(Continued)

FOREIGN PATENT DOCUMENTS

CN 111462307 A 7/2020
CN 112426719 A 3/2021

(Continued)

OTHER PUBLICATIONS

Tencent Technology, ISR, PCT/CN2022/125747, Jan. 18, 2023, 2 pgs.

(Continued)

*Primary Examiner* — Malina D. Blaise
(74) *Attorney, Agent, or Firm* — Morgan, Lewis & Bockius LLP

(57) ABSTRACT

A virtual character control method performed by a computer device. The method includes: displaying a virtual scene, the virtual scene comprising at least one virtual character; in response to receiving a target operation on a target region in the virtual scene, displaying a station control in the virtual scene; and in response to receiving a trigger operation on the station control, adjusting a station of the at least one virtual character based on a target adjustment mode, at least one of the target adjustment mode and the at least one virtual character being determined based on a user-customized operation of the station control. The method can realize collective adjustment of stations of a plurality of virtual characters based on a station control during the station adjustment of the virtual characters in a virtual scene, and (Continued)

also ensure the flexibility of the station adjustment of the virtual characters in the virtual scene.

20 Claims, 15 Drawing Sheets

(56)                    References Cited

U.S. PATENT DOCUMENTS

| | | | | |
|---|---|---|---|---|
| 11,278,810 | B1 * | 3/2022 | Sarria, Jr. | G06F 3/0482 |
| 11,344,809 | B2 * | 5/2022 | Kando | G06F 3/04842 |
| 2006/0252531 | A1 * | 11/2006 | Kando | A63F 13/335 |
| | | | | 463/36 |
| 2006/0252540 | A1 * | 11/2006 | Kando | A63F 13/10 |
| | | | | 463/36 |
| 2007/0260567 | A1 * | 11/2007 | Funge | A63F 13/67 |
| | | | | 706/47 |
| 2011/0304630 | A1 * | 12/2011 | McNeely | G06T 13/20 |
| | | | | 345/473 |
| 2011/0304638 | A1 * | 12/2011 | Johnston | G06T 11/40 |
| | | | | 345/582 |
| 2014/0066200 | A1 * | 3/2014 | Matsui | A63F 13/2145 |
| | | | | 463/31 |
| 2016/0259526 | A1 * | 9/2016 | Lee | G06F 3/04817 |
| 2017/0206797 | A1 * | 7/2017 | Solomon | G06N 3/006 |
| 2017/0354885 | A1 * | 12/2017 | Kitazono | A63F 13/47 |
| 2019/0295306 | A1 * | 9/2019 | Weston | A63F 13/56 |
| 2020/0346115 | A1 * | 11/2020 | Luo | A63F 13/5375 |
| 2020/0368622 | A1 * | 11/2020 | Kando | G06F 1/1669 |
| 2021/0038982 | A1 | 2/2021 | Guillemette et al. | |
| 2021/0146248 | A1 * | 5/2021 | Chen | A63F 13/837 |
| 2021/0213361 | A1 * | 7/2021 | Abecassis | A63F 13/35 |
| 2021/0331070 | A1 * | 10/2021 | Song | A63F 13/533 |
| 2022/0410007 | A1 * | 12/2022 | Jia | A63F 13/56 |
| 2023/0271087 | A1 * | 8/2023 | Hu | A63F 13/56 |
| | | | | 463/31 |
| 2023/0381647 | A1 * | 11/2023 | Mizukami | A63F 13/52 |
| 2023/0390640 | A1 * | 12/2023 | Seo | A63F 13/56 |
| 2024/0082731 | A1 * | 3/2024 | Sato | A63F 13/822 |
| 2024/0218367 | A1 * | 7/2024 | Anderson | C07K 14/005 |
| 2025/0083043 | A1 * | 3/2025 | Chen | A63F 13/2145 |

FOREIGN PATENT DOCUMENTS

| | | |
|---|---|---|
| CN | 112891944 A | 6/2021 |
| CN | 113101660 A | 7/2021 |
| CN | 114082189 A | 2/2022 |

OTHER PUBLICATIONS

92ghai.com, "[For] LXL Genting Game Super Powerful Card Recorder Script with the Most Functions on the Whole Network", Sep. 2021, Retrieved from the Internet: https://www.92ghai.com/thread-151832-1-1.html.

M.iefans.net, "Jian Wang 3 Fingertip Chess Game Interface Function Introduction", Nov. 2020, Retrieved from the Internet: https://m.jefans.net/info/v1136017.html.

Sohu.com, "Auto Chess Mobile Game Shares Several More Practical Standing Models", Breaking Through the Immortals, May 2019, Retrieved from the Internet: https://www.sohu.com/a/313840023_120099888.

Weixin.qq.com, Mobile Game Network, "How to Set Up and Edit the Lineup of the Golden Shovel Battle?", Aug. 2021, Retrieved from the Internet: https://mp.weixin.gg.com/s/DKKoQEpYf-PkUurQ4JWbNA.

Tencent Technology, WO, PCT/CN2022/125747, Jan. 18, 2023, 4 pgs.

Tencent Technology, IPRP, PCT/CN2022/125747, May 2, 2024, 5 pgs.

Tencent Technology, Japanese Office Action, JP Patent Application No. 2024-520846, Jul. 11, 2025, 4 pgs.

Tencent Technology, Korean Office Action, KR Patent Application No. 10-2024-7009540, Jul. 14, 2025, 21 pgs.

* cited by examiner

VIRTUAL CHARACTER CONTROL METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/125747, entitled "VIRTUAL CHARACTER CONTROL METHOD AND APPARATUS, DEVICE, STORAGE MEDIUM, AND PROGRAM PRODUCT" filed on Oct. 17, 2022, which claims priority to Chinese Patent Application No. 202111372101.8, entitled "VIRTUAL CHARACTER CONTROL METHOD AND APPARATUS, DEVICE, STORAGE MEDIUM, AND PROGRAM PRODUCT" filed on Nov. 18, 2021, all of which is incorporated by reference in its entirety.

FIELD OF THE TECHNOLOGY

Embodiments of this application relate to the technical field of virtual scenes, and in particular, to a virtual character control method and apparatus, a device, a storage medium, and a program product.

BACKGROUND OF THE DISCLOSURE

In applications with virtual scenes of auto chesses, in order to improve the flexibility of virtual battles, stations of virtual characters in the virtual scenes are usually adjustable.

In the related art, in order to quickly change the stations of a plurality of virtual characters, layout switching buttons are usually provided. Users can realize "one-button transposition" of the virtual characters in the virtual scenes through the layout switching buttons.

However, switchable layout types in the method for realizing "one-button transposition" by providing the layout switching buttons are fixed. Thus, the flexibility of station adjustment of the virtual characters in the virtual scenes is poor.

SUMMARY

Embodiments of this application provide a virtual character control method and apparatus, a device, a storage medium, and a program product, which can improve the flexibility of station adjustment of virtual characters in virtual scenes. The technical solutions are as follows:

According to one aspect, a virtual character control method is provided. The method includes:

- displaying a virtual scene, the virtual scene comprising at least one virtual character;
- in response to receiving a target operation on a target region in the virtual scene, displaying a station control in the virtual scene; and
- in response to receiving a trigger operation on the station control, adjusting a station of the at least one virtual character based on a target adjustment mode, at least one of the target adjustment mode and the at least one virtual character being determined based on a user-customized operation of the station control.

According to another aspect, a computer device is provided. The computer device includes a processor and a memory. The memory stores at least one computer program. The at least one computer program, when loaded and executed by the processor, causes the computer device to implement the foregoing virtual character control method.

According to another aspect, a non-transitory computer-readable storage medium is provided. The computer-readable storage medium stores at least one computer program. The computer program, when loaded and executed by a processor of a computer device, causes the computer device to implement the foregoing virtual character control method.

The technical solutions provided in this application may include the following beneficial effects:

By providing a station control, stations of customized virtual characters can be uniformly adjusted when a computer device receives a trigger operation based on the station control, or stations of target objects can be uniformly adjusted through a self-defined adjustment mode, or the stations of the customized virtual characters can be uniformly adjusted through the self-defined adjustment mode. Thus, when a station of a virtual character in a virtual scene is adjusted, stations of a plurality of virtual characters may be collectively adjusted based on the station control, and the flexibility of station adjustment of the virtual character in the virtual scene is also ensured.

DESCRIPTION OF EMBODIMENTS

Figure 1:
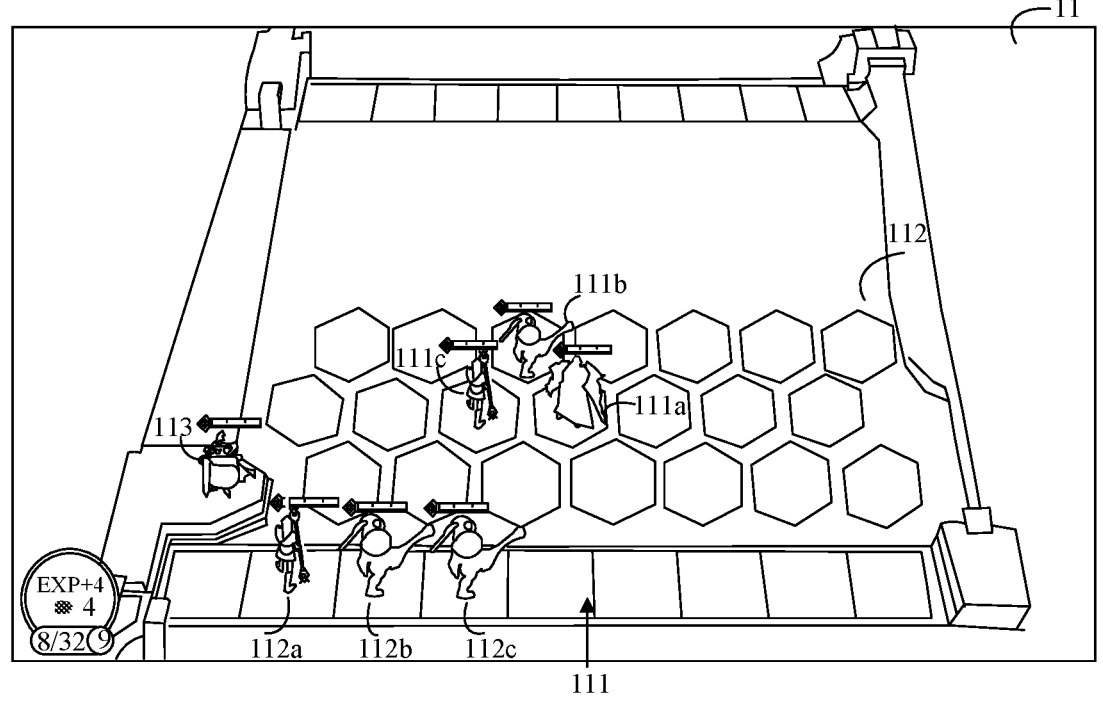
FIG. 1 is a schematic diagram of a chess battle picture according to an exemplary embodiment of this application.

This application provides a virtual character control method, which can improve the efficiency of station adjustment of virtual characters. To facilitate understanding, the following explains terms involved in this application.

1) Virtual Scene: The virtual scene is a virtual scene displayed (or provided) when an application is run on a terminal. The virtual scene may be a simulated environment scene of a real world, a semi-simulated semi-fictional three-dimensional environment scene, or a purely fictional three-dimensional environment scene. The virtual scene may be any one of a two-dimensional virtual scene, a 2.5-dimensional virtual scene, and a three-dimensional virtual scene. The following embodiments are illustrated as the virtual scene being a three-dimensional virtual scene, but are not limited thereto.

2) Auto Chess: The auto chess refers to a board game in which by pre-layout of "pieces" before a chess battle, the "pieces" can be automatically battled according to the pre-layout. The "pieces" are usually represented by virtual characters. During the battle, the virtual characters automatically cast various skills to battle. The battle usually adopts a turn-based system. When all the "pieces" of one party are killed (that is, the health values of the virtual characters are reduced to zero), the party is the loser of the battle. In some embodiments, in addition to having "chess piece virtual characters" for battling, both parties of the battle are separately provided with a virtual character to represent a user participating in the battle. The virtual character cannot be moved to a battle region or a preparation region as a "chess piece", and the virtual character is further provided with a health value (or blood volume). The health value of the virtual character is correspondingly reduced (battle losing) or unchanged (battle winning) according to the result of each battle. When the health value of the virtual character is reduced to zero, the user corresponding to the virtual character exits from the battle, and the remaining users continue to battle.

Chessboard: The chessboard refers to a region used for preparing and carrying out the battle in a battle interface of an auto chess game. The chessboard may be any one of a two-dimensional virtual chessboard, a 2.5-dimensional virtual chessboard, and a three-dimensional virtual chessboard. This application is not limited thereto.

The chessboard is divided into a battle region and a preparation region. The battle region includes a plurality of battle grids with the same size. The battle grids are used for placing battle pieces in the battle process. The preparation region includes a plurality of preparation grids. The preparation grids are used for placing preparation pieces. The preparation pieces will not participate in the battle in the battle process, and may be dragged and placed in the battle region during the preparation stage. Embodiments of this application are illustrated as battle chess piece characters including chess piece characters located in the battle region and chess piece characters located in the preparation region.

With regard to a setting manner of grids in the battle region, in some embodiments, the battle region includes n (rows)×m (columns) of battle grids. Schematically, n is an integer multiple of 2, and two adjacent rows of grids are aligned, or two adjacent rows of grids are interlaced. In addition, the battle region is equally divided into two parts in rows, namely, an own-party battle region and an opponent battle region. Users participating in the battle are located on upper and lower sides of the battle interface respectively, and during the preparation stage, the users can only place pieces in the own-party battle region. In other embodiments, the battle region is equally divided into two parts in columns, namely, an own-party battle region and an opponent battle region. Users participating in the battle are located on left and right sides of the battle interface respectively. The shape of the grids may be any one of square, rectangle, circle, and hexagon. This embodiment of this application is not limited to the shape of the grids.

In some embodiments, the battle grids are always displayed on the chessboard. In other embodiments, the battle grids are displayed when the users lay out the battle pieces, and when the battle pieces are placed in the grids, the battle grids are not displayed.

Schematically, FIG. 1 is a schematic diagram of a chess battle picture according to an exemplary embodiment of this application. As shown in FIG. 1, a chessboard 11 in a battle interface includes a battle region 111 and a preparation region 112. The battle region 111 includes 3×7 battle grids. The grids are hexagonal, and two adjacent rows of grids are interlaced. The preparation region 112 includes 9 preparation grids.

3) Virtual Characters in Auto Chess Game: The virtual characters refer to pieces placed on the chessboard, and include battle piece characters and candidate piece characters (namely, candidate piece characters in a virtual store) in a candidate piece character list. The battle piece characters include piece characters in the battle region and piece characters in the preparation region. The virtual characters may be virtual pieces, virtual people, virtual animals, cartoon people, and the like, and the virtual characters may be presented using a three-dimensional model. The candidate piece characters may be combined with the existing battle piece characters of the users to trigger a gain battle effect, and may also participate in the chess battle as piece characters alone.

In some embodiments, positions of the battle piece characters on the chessboard are changeable. During the preparation stage, the users may adjust the positions of the piece characters in the battle region, adjust the positions of the piece characters in the preparation region, move the piece characters in the battle region to the preparation region (in the presence of idle battle grids in the preparation region), or move the piece characters in the preparation region to the battle region. The positions of the piece characters in the preparation region are also adjustable during the battle stage.

In some embodiments, the positions of the piece characters in the battle region during the battle stage are different from those during the preparation stage. For example, during the battle stage, the piece characters may automatically move from the own-party battle region to the opponent battle region, and attack the piece characters of the opponent. Alternatively, the piece characters may automatically move from position A in the own-party battle region to position B in the own-party battle region.

In addition, during the preparation stage, the piece characters can only be present in the own-party battle region, and the piece characters of the opponent are invisible on the chessboard.

With regard to a manner of obtaining battle piece characters, in some embodiments, the users may use virtual money to purchase piece characters.

In some embodiments, a user participating in a battle is represented by a virtual character. The virtual character may be a virtual person, a virtual animal, a cartoon person, and the like. The following embodiments name such a virtual character as a player virtual character or a user virtual character.

Schematically, as shown in FIG. 1, a first battle piece character 111a, a second battle piece character 111b, and a third battle piece character 111c are displayed in the battle region 111, and a first preparation piece character 112a, a second preparation piece character 112b, and a third preparation piece character 112c are provided in the preparation region 112. A player virtual character 113 is displayed nearby the battle region and the preparation region.

Attribute: Piece characters in the auto chess game have respective attributes, including at least two of the following attributes: a camp to which the piece characters belong (such as alliance A, alliance B, and centrist), occupations of the piece characters (such as warriors, shooters, masters, assassins, guards, swordsmen, gunmen, and fighters), attack types of the piece characters (such as magic and physics), and identities of the piece characters (such as nobles, devils, and elves).

In some embodiments, each piece character has at least two dimensions of attributes, and equipment carried by the piece character may enhance the attributes of the piece character.

In some embodiments, in the battle region, when different piece characters have associated attributes (different pieces have the same attribute or different pieces have complementary attributes) and a quantity reaches a quantity threshold (or fetter), all the piece characters with the attribute or all the piece characters in the battle region can obtain a gain effect corresponding to the attribute. For example, when the battle region includes two piece characters with the warrior attribute at the same time, all the piece characters obtain a defense bonus of 10%. When the battle region includes four battle piece characters with the warrior attribute at the same time, all the piece characters obtain a defense bonus of 20%. When the battle region includes three piece characters with the elf attribute at the same time, all the piece characters obtain an evasion probability bonus of 20%.

The virtual character control method shown in this application may be applied to scenes with the requirements of station control of virtual characters, such as the foregoing auto chess battle scene and a card battle scene. The virtual character control method provided in this application is illustrated with the auto chess battle scene in this application.

Figure 2:
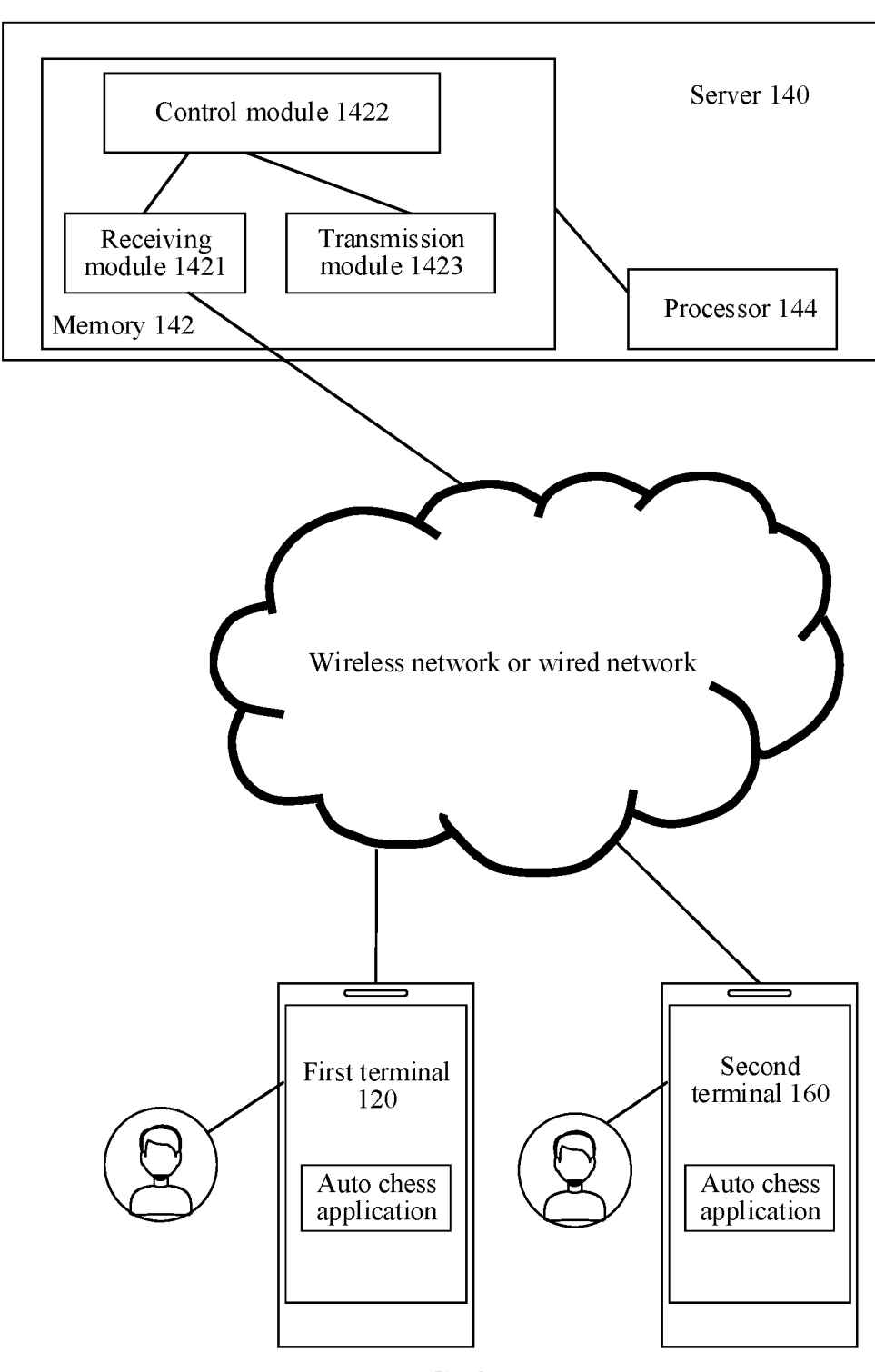
FIG. 2 shows a block diagram of a computer system according to an exemplary embodiment of this application.

FIG. 2 shows a block diagram of a computer system according to an exemplary embodiment of this application. The computer system includes: a first terminal 120, a server 140, and a second terminal 160.

An auto chess game application is installed and run in the first terminal 120. The first terminal 120 is a terminal used by a first user. The first user uses the first terminal 120 to lay out piece characters in a battle region of a chessboard during a preparation stage of a battle. The first terminal 120 automatically controls the piece characters to battle according to attributes, skills, and layout of the piece characters in the battle region.

The first terminal 120 is connected to the server 140 through a wireless network or a wired network.

The server 140 includes at least one of a server, a plurality of servers, a cloud computing platform, and a virtualization center. The server 140 schematically includes a processor 144 and a memory 142. The memory 142 includes a receiving module 1421, a control module 1422, and a transmission module 1423. The server 140 is configured to provide background services for the auto chess game application, such as providing picture rendering services for auto chess games. Schematically, the receiving module 1421 is configured to receive layout information of the piece characters transmitted by a client. The control module 1422 is configured to control the piece characters to battle automatically according to the layout information of the piece characters. The transmission module 1423 is configured to transmit a battle result to the client. In some embodiments, the server 140 undertakes primary computing tasks, and the first terminal 120 and the second terminal 160 undertake secondary computing tasks. Or, the server 140 undertakes secondary computing tasks, and the first terminal 120 and the second terminal 160 undertake primary computing tasks. Or, the server 140, the first terminal 120, and the second terminal 160 perform cooperative computing using a distributed computing architecture.

The server 140 may adopt a synchronization technology to make picture performances of a plurality of clients consistent. Exemplarily, the synchronization technology adopted by the server 140 includes: a state synchronization technology or a frame synchronization technology.

Figures 3, 4:
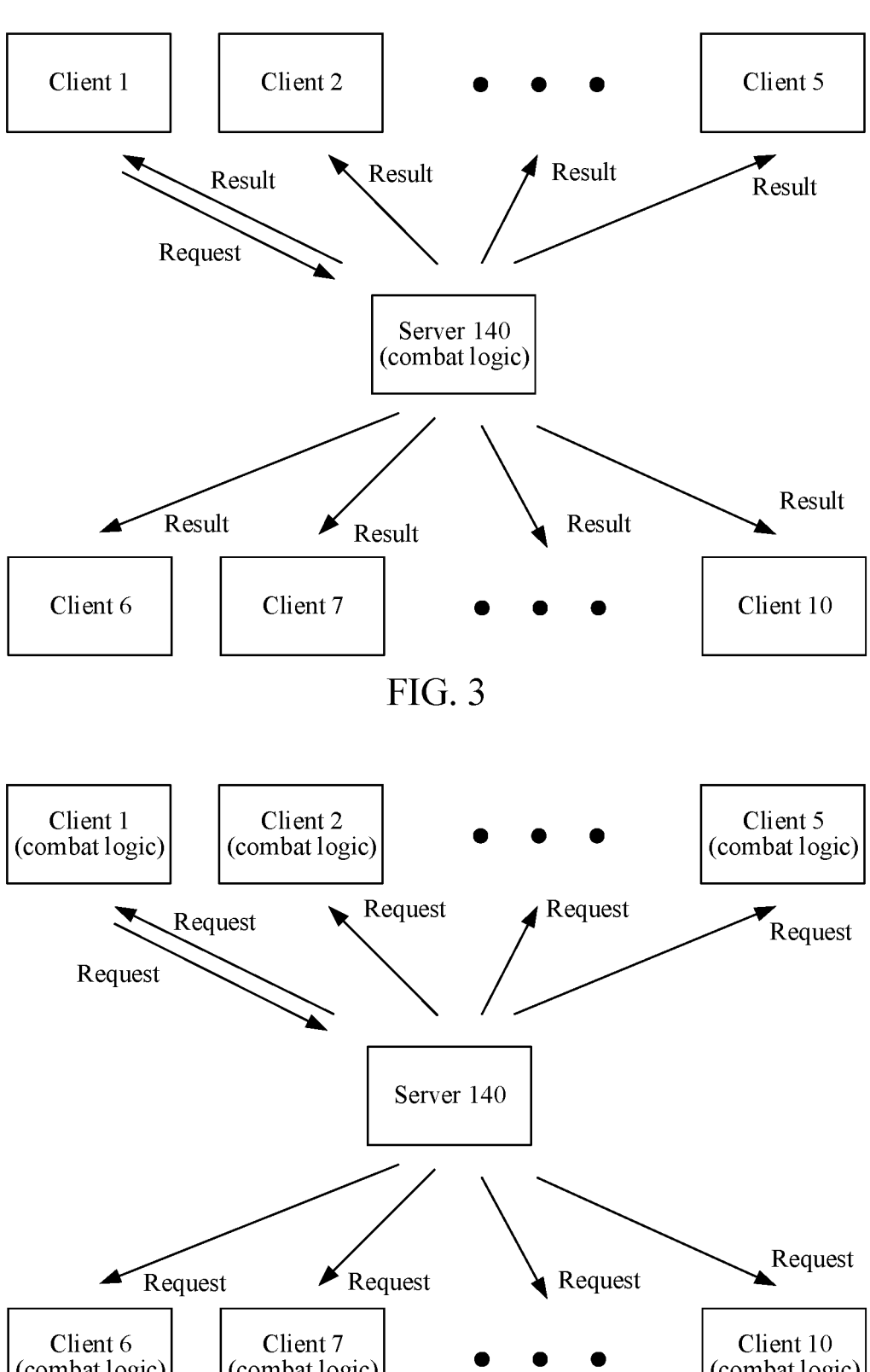
FIG. 3 shows a schematic diagram of a state synchronization technology according to an exemplary embodiment of this application.
FIG. 4 shows a schematic diagram of a frame synchronization technology according to an exemplary embodiment of this application.

State Synchronization Technology: In an embodiment based on FIG. 2, the server 140 synchronizes with the plurality of clients using the state synchronization technology. FIG. 3 shows a schematic diagram of a state synchronization technology according to an exemplary embodiment of this application. In the state synchronization technology, as shown in FIG. 3, combat logic is run in the server 140. When a state change occurs for a piece character in the battle chessboard, the server 140 transmits a state synchronization result to all clients, such as client 1 to client 10.

In an exemplary example, client 1 transmits a request to the server 140. The request carries piece characters participating in a chess battle and a layout of the piece characters. Then, the server 140 is configured to generate a state of the piece characters during the game according to the piece characters and the layout of the piece characters, and the server 140 transmits the state of the piece characters during the battle to client 1. Then, the server 140 transmits data of transmitting virtual props to client 1 to all the clients, and all the clients update local data and interface presentations according to the data.

Frame Synchronization Technology: In an embodiment based on FIG. 2, the server 140 synchronizes with the plurality of clients using the frame synchronization technology. FIG. 4 shows a schematic diagram of a frame synchronization technology according to an exemplary embodiment of this application. In the frame synchronization technology, as shown in FIG. 4, combat logic is run in all clients. Each client transmits a frame synchronization request to the server. The frame synchronization request carries local data changes of the client. After receiving a frame synchronization request, the server 140 forwards the frame synchronization request to all the clients. After receiving the frame synchronization request, each client processes the frame synchronization request according to local combat logic, and updates local data and interface performances.

The second terminal 160 is connected to the server 140 through the wireless network or the wired network.

An auto chess game application is installed and run in the second terminal 160. The second terminal 160 is a terminal used by a second user. The second user uses the second terminal 160 to lay out piece characters in a battle region of a chessboard during a preparation stage of a battle. The second terminal 160 automatically controls the piece characters to battle according to attributes, skills, and layout of the piece characters in the battle region.

In some embodiments, the piece characters laid out by the first user through the first terminal 120 and by the second user through the second terminal 160 are located in different regions on the same chessboard. That is, the first user and the second user are in the same battle.

In some embodiments, applications installed on the first terminal 120 and the second terminal 160 are the same, or the applications installed on the two terminals are the same type of applications on different control system platforms. The first terminal 120 may generally refer to one of multiple terminals, and the second terminal 160 may generally refer to another of the multiple terminals. This embodiment is exemplified only by the first terminal 120 and the second terminal 160. The first terminal 120 and the second terminal 160 have the same or different device types. The device types include: at least one of a smartphone, a tablet computer, an e-book reader, a digital player, a laptop portable computer, and a desktop computer.

A person skilled in the art may know that the number of the foregoing terminals may be larger or smaller. For example, there may be only one terminal (that is, users battle against artificial intelligence (AI)), or the quantity of terminals is 8 ($1v1v1v1v1v1v1v1$, eight users battle to be eliminated cyclically, and finally a winner is determined) or more. This embodiment of this application is not limited to the quantity of terminals and device types.

Figure 5:
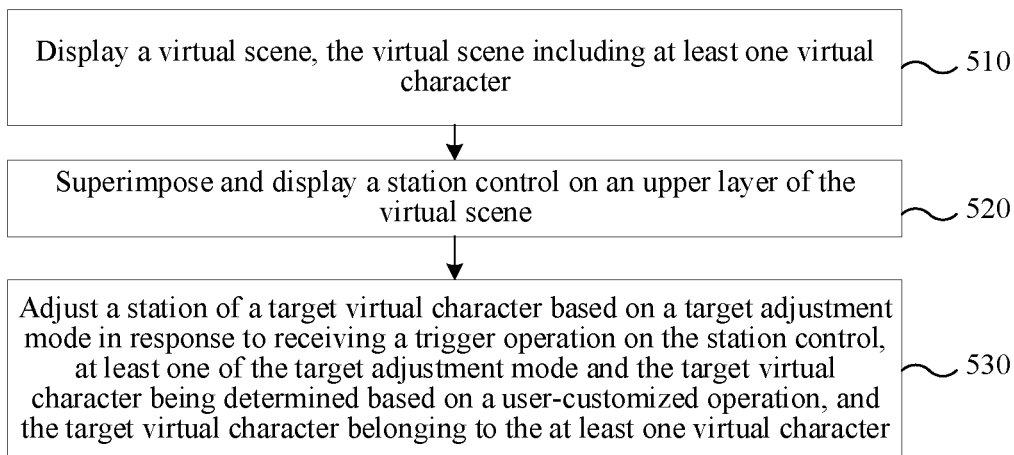
FIG. 5 shows a flowchart of a virtual character control method according to an exemplary embodiment of this application.

FIG. 5 shows a flowchart of a virtual character control method according to an exemplary embodiment of this application. The method may be performed by a computer device. The computer device may be implemented as a terminal or a server. As shown in FIG. 5, the virtual character control method may include the following steps:

Step 510: Display a virtual scene, the virtual scene including at least one virtual character.

In some embodiments, a target region of the virtual scene includes the at least one virtual character.

In a possible implementation, the virtual scene may include a battle region and a preparation region. The target region may be the battle region in the virtual scene. The at least one virtual character is a virtual character in the battle region. The at least one virtual character is a virtual character controlled by a current user.

Step 520: Superimpose and display a station control on an upper layer of the virtual scene.

Figure 6:
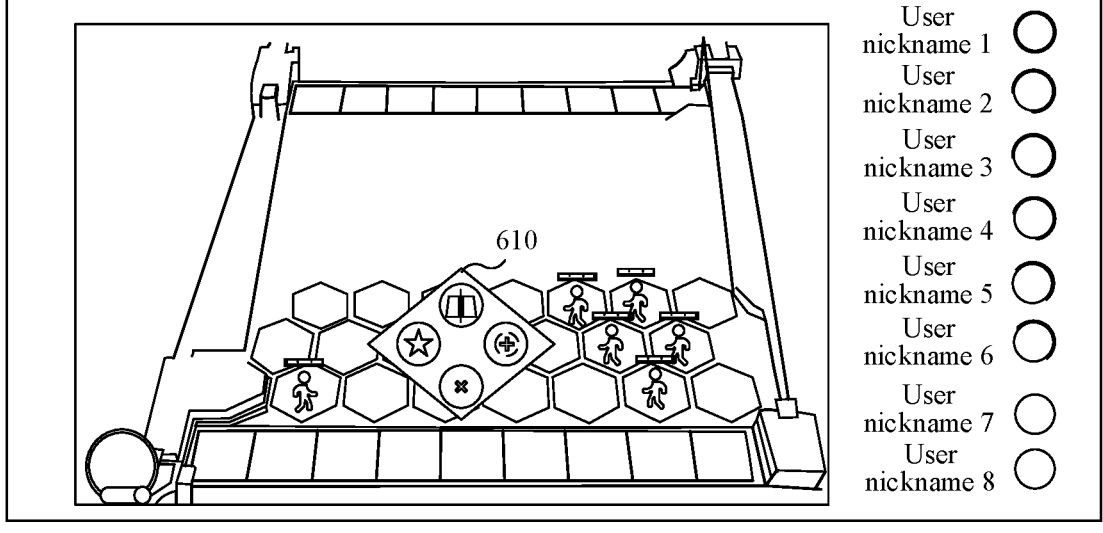
FIG. 6 shows a schematic diagram of a virtual scene according to an exemplary embodiment of this application.

In this embodiment of this application, the at least one virtual character in the target region may be in a battle stage and a preparation stage in the virtual scene. During the preparation stage, the user may adjust a station of the at least one virtual character in the virtual scene to deploy a war situation. Therefore, in a possible implementation, the station control may be superimposed on the upper layer of the virtual scene, whereby the user may quickly realize the custom deployment of the station of the virtual character in the virtual scene through the station control. FIG. 6 shows a schematic diagram of a virtual scene according to an exemplary embodiment of this application. As shown in FIG. 6, a station control 610 is superimposed and displayed on the upper layer of the virtual scene. The station control may be a single control or a set of a plurality of sub-controls with a station control function. The station control shown in FIG. 6 includes at least one sub-control. Each sub-control is configured to trigger different custom station controls. Optional, when the station control is a single control, the custom station control corresponding to the station control may be changed based on an operation mode of the user. Schematically, different custom station controls may be determined based on continuous clicks/taps of the user to the station control. For example, the user clicks/taps the station control once to determine a custom station adjustment mode as a first adjustment mode. The user doubly clicks/taps the station control to determine the custom station adjustment mode as a second adjustment mode, and so on. Alternatively, different custom station controls may be determined based on a touch-and-hold duration of the station control by the user. For example, when the touch-and-hold duration is less than a first duration threshold, the custom station adjustment mode is determined as the first adjustment mode. When the touch-and-hold duration is greater than the first duration threshold but less than a second duration threshold, the custom station adjustment mode is determined as the second adjustment mode, and so on.

Step 530: Adjust a station of a target virtual character based on a target adjustment mode in response to receiving a trigger operation on the station control, at least one of the target adjustment mode and the target virtual character being determined based on a user-customized operation; and the target virtual character belonging to the at least one virtual character.

The target virtual character may be all or part of the virtual characters in the target region in the virtual scene determined based on the user-customized operation, or the target virtual character is a default quantity of virtual characters corresponding to the target adjustment mode determined based on the user-customized operation. For example, the target adjustment mode performs the station adjustment of all the virtual characters in the target region by default. That is to say, the system defaults that the target virtual character is all the virtual characters in the at least one virtual character at this moment.

In this embodiment of this application, the user may customize the target virtual character, including the position and quantity of the target virtual character. The target adjustment mode is a default adjustment mode. Or, the user may customize the target adjustment mode of the target virtual character. The target virtual character is part or all of the default virtual characters. Or, the user may customize the target adjustment mode of the target virtual character on the basis of customizing the target virtual character. That is to say, the custom operation may include at least one of a character selection operation and a layout setting operation.

To sum up, according to the virtual character control method provided by this embodiment of this application, by providing a station control, stations of customized virtual characters can be uniformly adjusted when a computer device receives a trigger operation based on the station control, or stations of target objects can be uniformly adjusted through a self-defined adjustment mode, or the stations of the customized virtual characters can be uniformly adjusted through the self-defined adjustment mode. Thus, when a station of a virtual character in a virtual scene is adjusted, stations of a plurality of virtual characters may be collectively adjusted based on the station control, and the flexibility of station adjustment of the virtual character in the virtual scene is also ensured.

Figure 7:
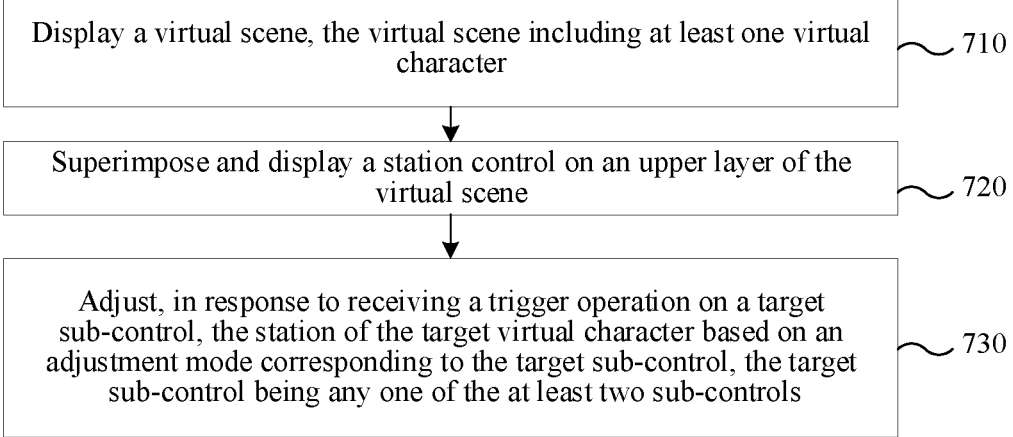
FIG. 7 shows a flowchart of a virtual character control method according to an exemplary embodiment of this application.

FIG. 7 shows a flowchart of a virtual character control method according to an exemplary embodiment of this application. The method may be performed by a computer device. The computer device may be implemented as a terminal or a server. As shown in FIG. 7, the virtual character control method may include the following steps:

Step 710: Display a virtual scene, the virtual scene including at least one virtual character.

The virtual scene may be a scene in which virtual characters controlled by two operation users battle against each other. The operation users may correspond to respective battle regions and preparation regions. When a first user controls a virtual character in the virtual scene, the virtual character corresponding to the first user may be controlled. In other words, at least one virtual character contained in the target region of the virtual scene may be virtual characters belonging to the same camp. The target region may be a battle region in the current camp.

Step 720: Superimpose and display a station control on an upper layer of the virtual scene.

In a possible implementation, the station control may be superimposed and displayed on the virtual scene when displaying the virtual scene. Or, in another possible implementation, the station control is not superimposed and displayed on the upper layer of the virtual scene when displaying the virtual scene, but superimposed and displayed on the upper layer of the virtual scene after receiving a specified operation. Schematically, in response to receiving an activation operation, the station control is superimposed and displayed on the upper layer of the virtual scene.

The activation operation includes: at least one of a target operation executed on a target region in the virtual scene and a trigger operation on an activation control.

The target operation may include a touch-and-hold operation on the target region. In some embodiments, the target operation may further include a double-click/tap operation on the target region, or a triple-click/tap operation on the target region, or a swipe operation on the target region, and the like. The activation control may be a control provided at any position on the upper layer of the virtual scene, and is configured to call the station control after receiving the trigger operation.

Figure 8:
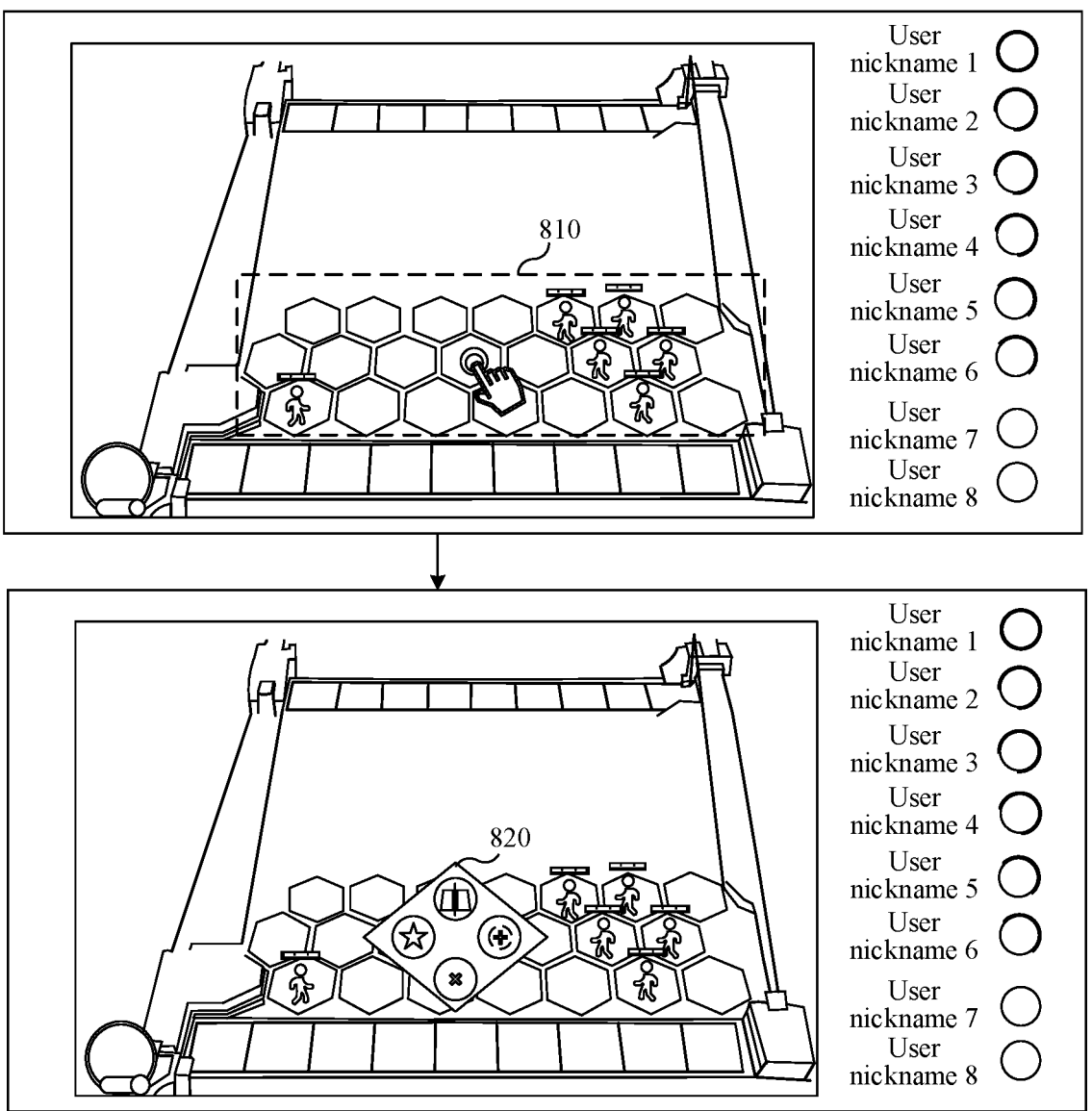
FIG. 8 shows a schematic diagram of a virtual scene according to an exemplary embodiment of this application.

The station control in this embodiment of this application is, for example, a set of a plurality of sub-controls with a station control function. The station control includes at least two sub-controls. FIG. 8 shows a schematic diagram of a virtual scene according to an exemplary embodiment of this application. The target operation is, for example, a touch-and-hold operation on the target region. As shown in FIG. 8, after receiving a target operation (e.g., a touch-and-hold operation) performed by a user on a target region 810, a station control 820 is superimposed and displayed on an upper layer of the virtual scene.

Step 730: Adjust, in response to receiving a trigger operation on a target sub-control, the station of the target virtual character based on an adjustment mode corresponding to the target sub-control, the target sub-control being one of the at least two sub-controls.

Optional, different sub-controls trigger different custom functions. Schematically, a first sub-control of at least two sub-controls may trigger the character selection operation to customize the station-adjusted virtual character, obtain a target virtual character, and then adjust a station of the target virtual character in a default station adjustment mode.

In an exemplary solution, the default station adjustment mode may refer to mirror switching of the station of the target virtual character. The mirror switching refers to symmetrically adjusting, using a target axis as a mirror line, the station of the target virtual character based on the mirror line.

A second sub-control in the at least two sub-controls may trigger the layout setting operation to customize the station adjustment mode of a virtual character to be station-adjusted. The virtual character to be station-adjusted may be a virtual character set by default, such as all the virtual characters in the target region.

A fourth sub-control in the at least two sub-controls may trigger the layout setting operation after triggering the character selection operation, so as to change the station of the customized virtual character into a custom layout mode, thereby improving the autonomy of overall station adjustment of the virtual character by the user, and further improving the flexibility of station change of the virtual character.

In a possible implementation, the process of adjusting the station of the virtual character based on the first sub-control may be implemented as the following process:

adjusting a selection state of the at least one virtual character as an optional state in response to receiving a trigger operation on a first sub-control in the at least two sub-controls;

obtaining, in response to receiving a character selection operation, a virtual character selected based on the character selection operation as the target virtual character; and switching the station of the target virtual character from a first position to a second position in response to the end of the character selection operation, whereby the station of the target virtual character before and after position switching is symmetrical about a target axis.

The operation of switching the station of the target virtual character from a first position to a second position whereby the station of the target virtual character before and after position switching is symmetrical about a target axis may be referred to as mirror switching. That is to say, the first sub-control is configured to control at least one virtual character in the target region to perform mirror switching based on the station of the virtual character determined by the character selection operation. The first position is used for indicating a position before the mirror switching of the virtual character, and the second position is used for indicating a position after the mirror switching. The target virtual character may be all or part of the at least one virtual character.

Schematically, the target axis may be a central axis of the virtual scene, or the target axis may be a central axis relative to the target virtual character, or the target axis may be any one of random axes determined based on a drawing operation of the user.

Figure 9:
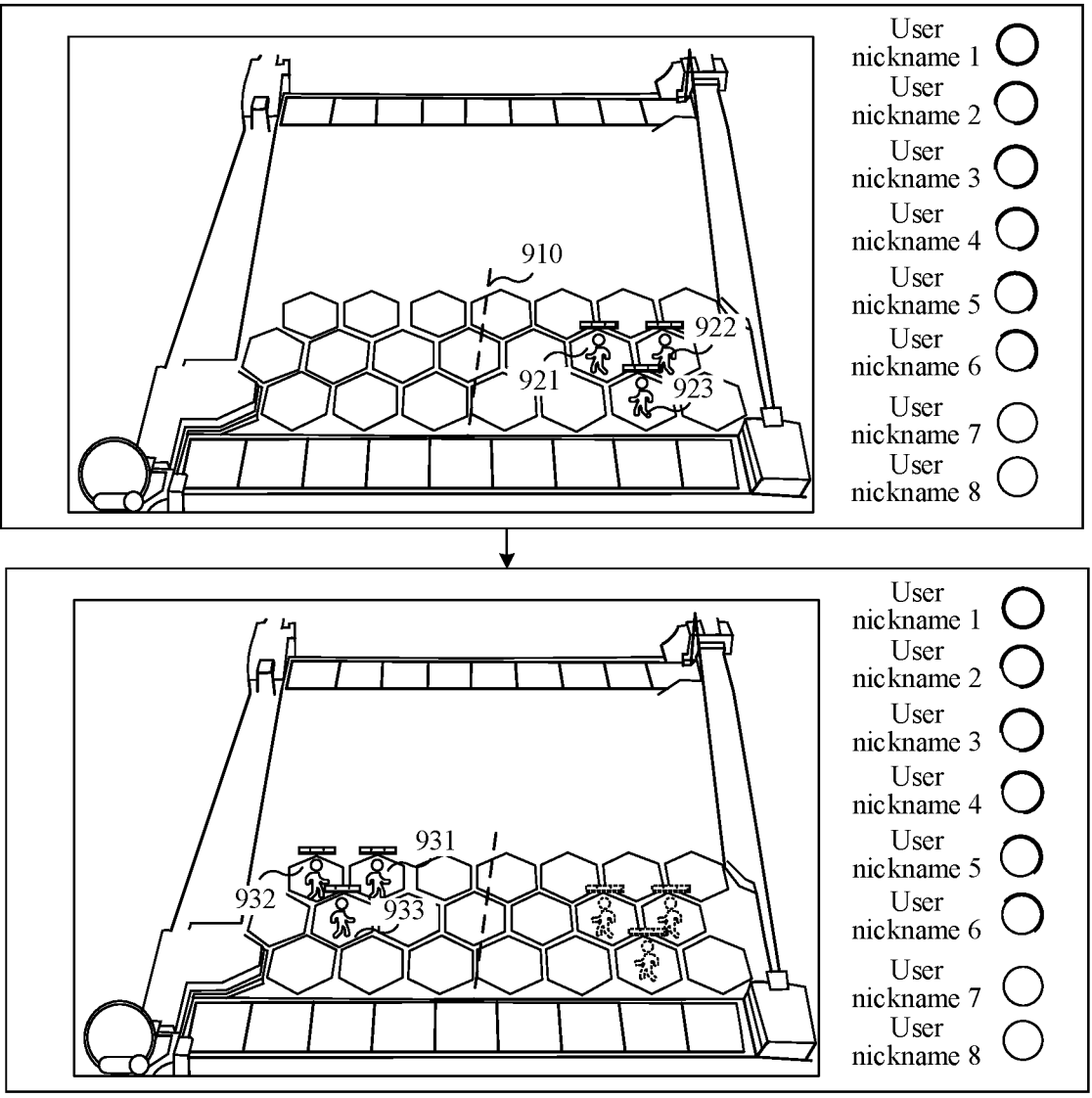
FIG. 9 shows a schematic diagram of a virtual scene before and after virtual character mirroring according to an exemplary embodiment of this application.

In some embodiments, the target axis may be set by a developer, or may be set or drawn by the user in advance. Alternatively, in a possible implementation, a mirror line setting interface is displayed in response to the end of the character selection operation. The mirror line setting interface includes at least two mirror line selection controls corresponding to different mirror line setting modes respectively. A target axis corresponding to one of the mirror line selection controls is determined as a mirror line based on a selection operation of the user. The target axis corresponding to the at least two mirror line selection controls includes the central axis of the virtual scene, or the central axis relative to the target virtual character, or any two of the random axes determined based on the drawing operation of the user. Schematically, when the user selects the mirror line as a random axis determined based on the drawing operation of the user, a mirror line drawing interface is entered, and an axis drawn by the user in the mirror line drawing interface is determined as the mirror line. The mirror line drawing interface may be a virtual scene in a drawable state. FIG. 9 shows a schematic diagram of a virtual scene before and after virtual character mirroring according to an exemplary embodiment of this application. The mirror line is, for example, a target axis determined based on the drawing operation of the user. As shown in FIG. 9, a mirror line 910 is an axis drawn by the user based on actual requirements. The target axis is used as the mirror line for mirror switching on the station of the target virtual character in the target region. The target virtual character determined by the character selection operation is, for example, all the virtual characters in the target region. A virtual character 921 is switched from a current station mirror to a station 931. A virtual character 922 is switched from the current station mirror to a station 932. A virtual character 923 is switched from the current station mirror to a station 933.

In a possible implementation, if the station of the virtual character mirrored based on the mirror line exceeds the target region, the station of the virtual character is not adjusted, and the station of the mirrored virtual character that does not exceed the target region is adjusted.

In a possible implementation, in response to the presence of a second virtual character at a second position after mirroring a first virtual character in the target virtual character, a station of the first virtual character station may be adjusted in any one of the following manners:

skipping adjustment of the station of the first virtual character;

exchanging the station of the first virtual character with a station of the second virtual character;

moving the second virtual character to an empty station adjacent to the second position, and moving the first virtual character to the second position; and maintaining the position of the second virtual character, and moving the first virtual character to the empty station adjacent to the second position.

In a possible implementation, the character selection operation includes: at least one of a continuous swipe operation based on the virtual scene, or a range selection operation based on the virtual scene, or a click/tap operation on virtual characters.

Figure 10:
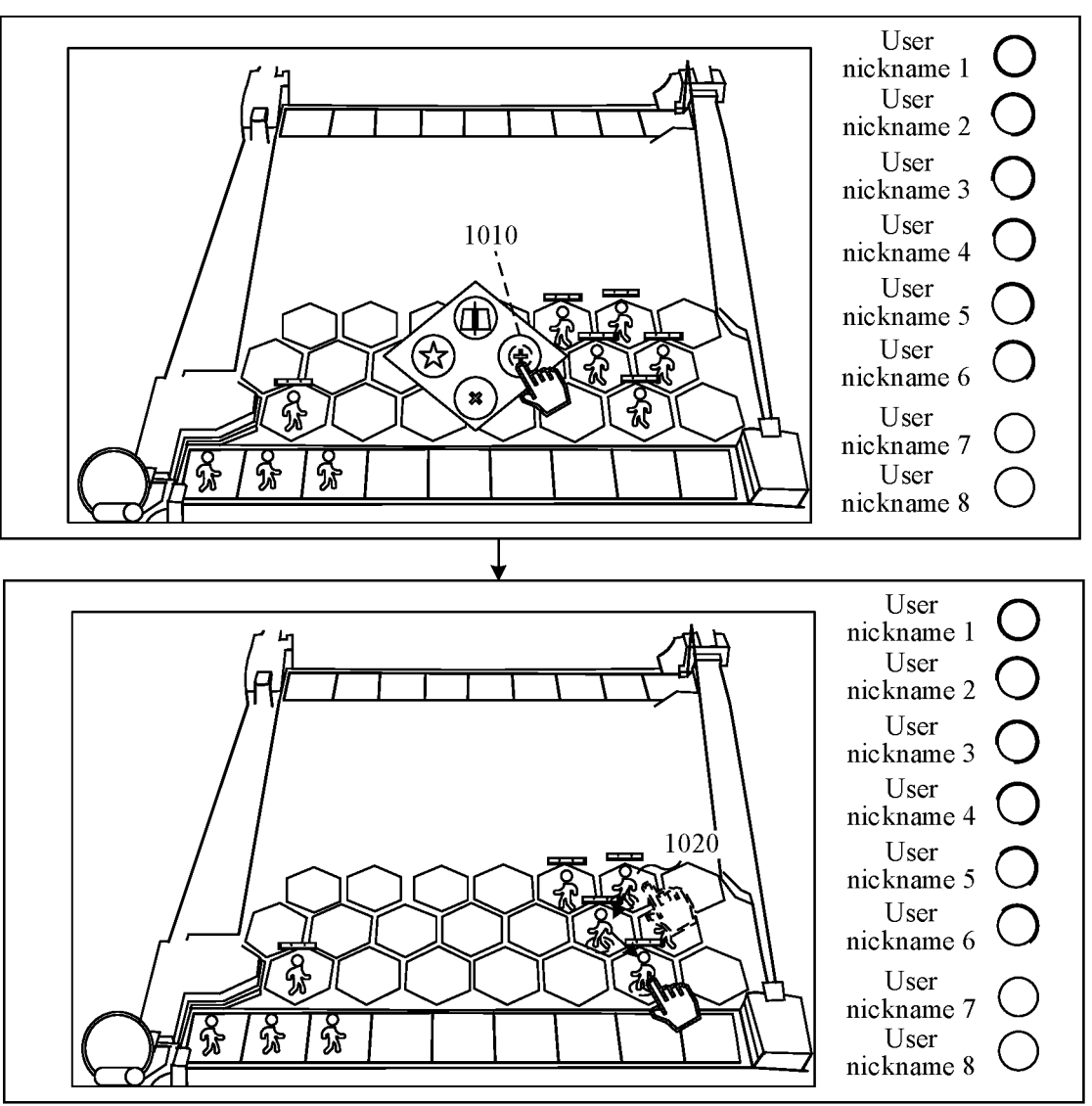
FIG. 10 shows a schematic diagram of determining a target virtual character based on a continuous swipe operation according to an exemplary embodiment of this application.

In response to the character selection operation being a continuous swipe operation based on the virtual scene, the target virtual character is a virtual character selected based on the continuous swipe operation from the at least one virtual character. Schematically, the swipe operation refers to a one-time moving operation on a terminal screen without lifting a finger of the user, or a one-time moving operation on a control device without releasing a target physical button (such as a left button of a mouse) by the user. FIG. 10 shows a schematic diagram of determining a target virtual character based on a continuous swipe operation according to an exemplary embodiment of this application. As shown in FIG. 10, after receiving a trigger operation on a first sub-control 1010 by the user, a selection state of at least one virtual character in the target region is adjusted to an optional state. The user may take any virtual character in the target region as an operation starting point, complete a continuous swipe operation without interrupting the operation (for example, not lifting the finger and not releasing the target physical button), and obtain a virtual character passed by the continuous swipe operation as a target virtual character 1020.

Figure 11:
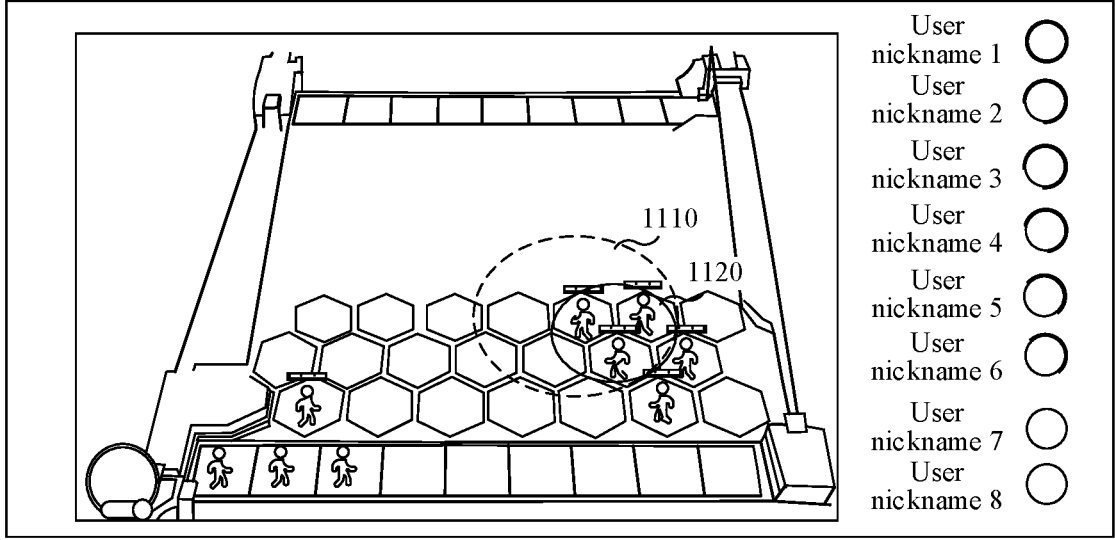
FIG. 11 shows a schematic diagram of determining a target virtual character through a range selection operation according to an exemplary embodiment of this application.

In response to the character selection operation being a range selection operation based on the virtual scene, the target virtual character is a virtual character within a range determined based on the range selection operation in the at least one virtual character. Schematically, the range selection operation based on the virtual scene may be a box selection operation based on the virtual scene. A box selection range corresponding to the range selection operation may be larger than the station range of the target virtual character in the target region. Schematically, FIG. 11 shows a schematic diagram of determining a target virtual character through a range selection operation according to an exemplary embodiment of this application. As shown in FIG. 11, the user determines a larger box selection range 1110 through the range selection operation on the virtual scene. The computer device may obtain the virtual character within a box selection range 1110 as a target virtual character 1120. The shape of the box selection range may be any one of square, rectangle, oval, circle, and the like. This application is not limited thereto.

In response to the character selection operation being a click/tap operation on virtual characters, the target virtual character is a virtual character selected based on the click/tap operation from the at least one virtual character. In this case, the user may realize the decentralized selection of virtual characters without considering the selection order.

Schematically, the three modes of determining the target virtual character may be used separately, or may be used in pairs, or may be used in combination. This application is not limited thereto.

Different character selection operations may correspond to the same or different operation end nodes. Schematically, if the character selection operation is a continuous swipe operation based on the virtual scene, the station of the target virtual character is switched from the first position to the second position in response to the interruption of the continuous swipe operation based on the virtual scene.

That is to say, when the continuous swipe operation is interrupted, it is determined that the continuous swipe operation is ended. At this moment, the computer device may switch the station of the target virtual character from the first position to the second position. For example, when the continuous swipe operation is interrupted, the computer device automatically takes the target axis as the mirror line to perform mirror switch on the station of the target virtual character. For example, when the user performs the continuous swipe operation through the finger, the finger is lifted. Alternatively, when the user performs the continuous swipe operation through a physical device, the target physical button is released, and it is determined that the character selection operation is ended.

In another possible implementation, a determination control is displayed in response to receiving the trigger operation on the first sub-control. In this case, the station of the target virtual character is switched from the first position to the second position in response to receiving the trigger operation on the determination control.

Figure 12:
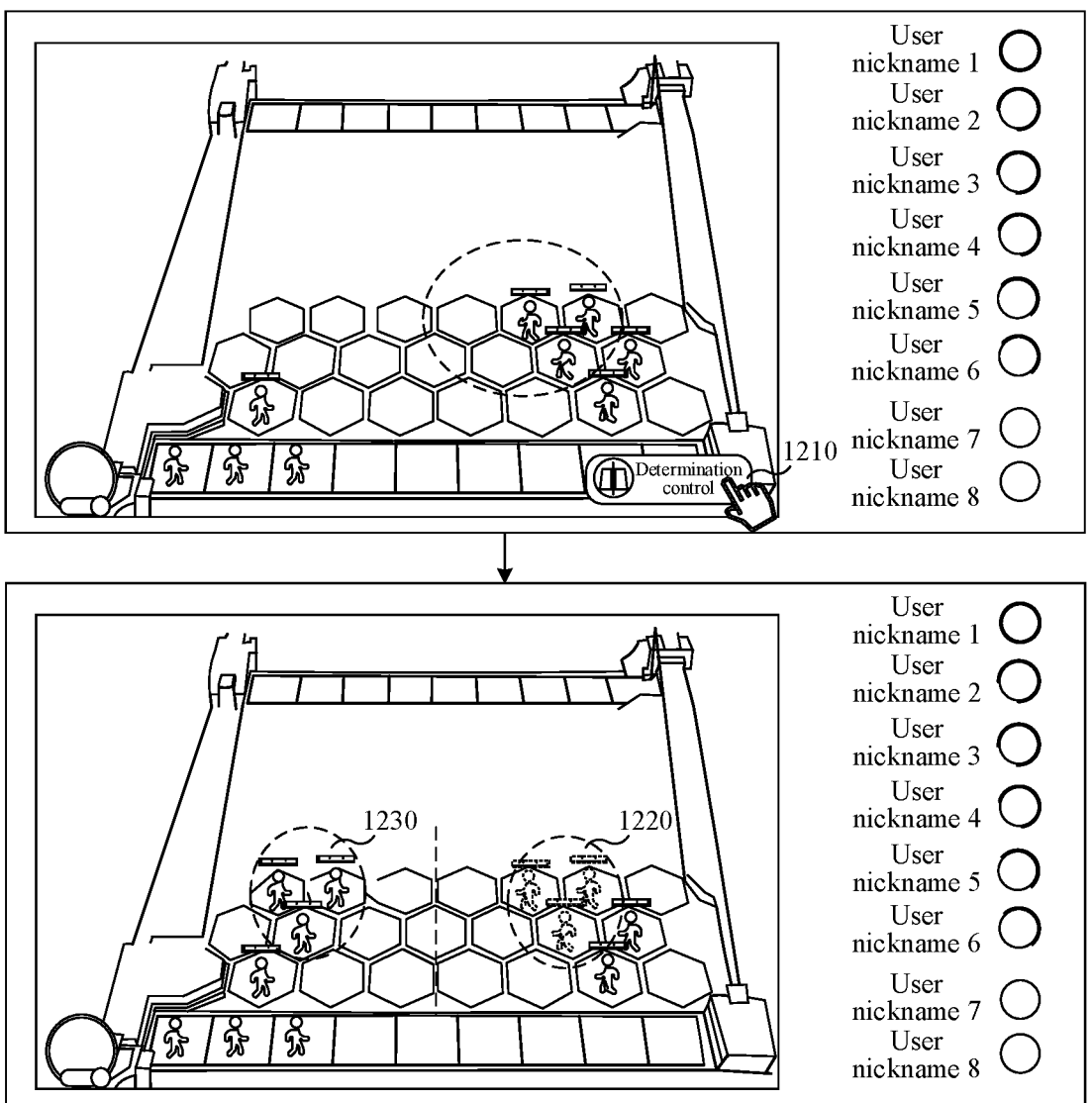
FIG. 12 shows a schematic diagram of a virtual scene according to an exemplary embodiment of this application.

That is to say, when it is determined that the target virtual character is selected by the character selection operation based on the first sub-control, the determination control may be superimposed and displayed on the upper layer of the virtual scene. FIG. 12 shows a schematic diagram of a virtual scene according to an exemplary embodiment of this application. The target virtual character is determined, for example, based on the box selection operation of the virtual scene. As shown in FIG. 12, after receiving the trigger operation on the first sub-control by the user, a determination control 1210 is superimposed and displayed on the upper layer of the virtual scene. After the user determines the target virtual character through at least one of the three modes determining the target virtual character, when receiving the selection operation on the determination control 1210, it is determined that the character selection operation is ended, and the determined station of the target virtual character is mirror-switched based on the target axis. The determination control is configured to trigger a mirror operation based on a target axis. The target axis is a mirror line set in advance or by default. Alternatively, the determination control is configured to trigger to enter a mirror line setting interface, so as to perform a mirror operation on the target virtual character based on the mirror line set in the mirror line setting interface. As shown in FIG. 12, a station 1220 of the target virtual character is switched to a station 1230 by performing mirror switching on the station of the target virtual character with, for example, the central axis of the virtual scene.

In a possible implementation, the at least one sub-control further includes a third sub-control for performing mirror switching on the stations of all the virtual characters in the target region. Schematically, the process of adjusting the station of the virtual character based on the third sub-control may be implemented as the following process:

switching the station of the at least one virtual character from the first position to the second position in response to receiving the trigger operation on a third sub-control in the at least two sub-controls, whereby the station of the at least one virtual character before and after position switching is symmetrical about a target axis.

Figure 13:
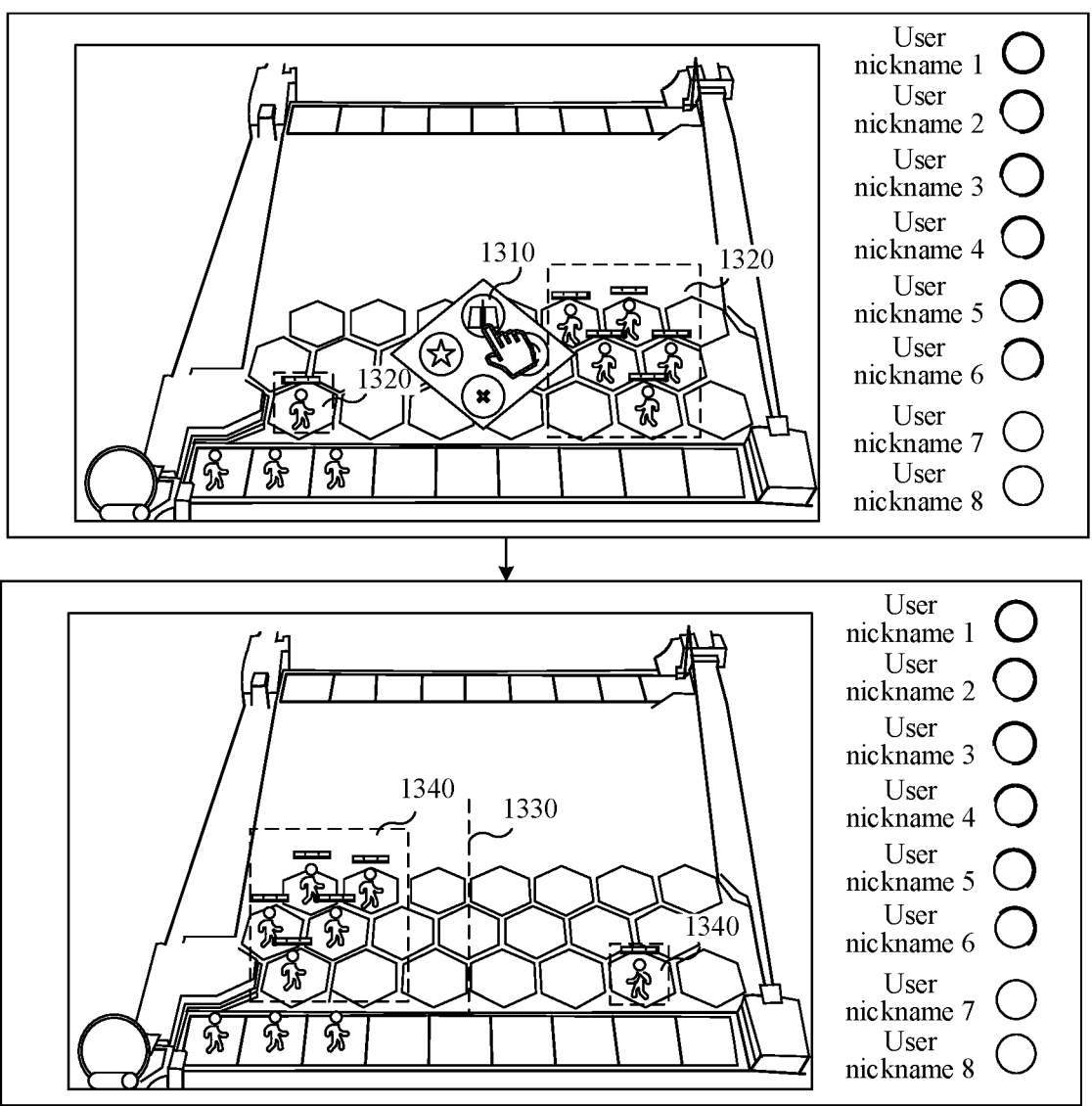
FIG. 13 shows a schematic diagram of a virtual scene before and after virtual character mirroring according to an exemplary embodiment of this application.

That is to say, when the trigger operation on the third sub-control is received, all the virtual characters in the target region are obtained as the target virtual character by default. FIG. 13 shows a schematic diagram of a virtual scene before and after virtual character mirroring according to an exemplary embodiment of this application. As shown in FIG. 13, when the user selects a third sub-control 1310 in a station operation control, all the virtual characters in the target region are determined as a target virtual character 1320 by default. When a mirror line 1330 is the central axis of the virtual scene, the station of the target virtual character is mirror-switched based on the mirror line 1330 to obtain a station-changed target virtual character 1340.

In some embodiments, after determining the target virtual character based on the trigger operation on the third sub-control, it is determined that the character selection operation is ended, a mirror line setting interface may be entered to set the image line based on the selection operation of the user, and the station of the target virtual character may be mirror-switched based on the mirror line.

In a possible implementation, the process of adjusting the station of the virtual character based on the second sub-control may be implemented as the following process:

displaying a layout display region in response to receiving a trigger operation on a second sub-control in the at least two sub-controls, at least one station layout being displayed in the layout display region, and the station layout being determined based on layout settings of the user; and adjusting, in response to receiving a selection operation on a target station layout, the station of the target virtual character based on the target station layout, the target station layout being one of the at least one station layout.

The at least one station layout included in the layout display region may be set by the user before controlling the virtual character to enter the virtual scene in advance, or the at least one station layout may be added by the user after controlling the virtual character to enter the virtual scene, or the at least one station layout may be set by the user before controlling the virtual character to enter the virtual scene in advance and added by the user after controlling the virtual character.

Schematically, the process of adding station layout after the user controls the virtual character to enter the virtual scene may be implemented as:

displaying a layout planning interface;

generating the station layout based on stations determined in the layout planning interface; and adding the station layout to the layout display region.

Figure 14:
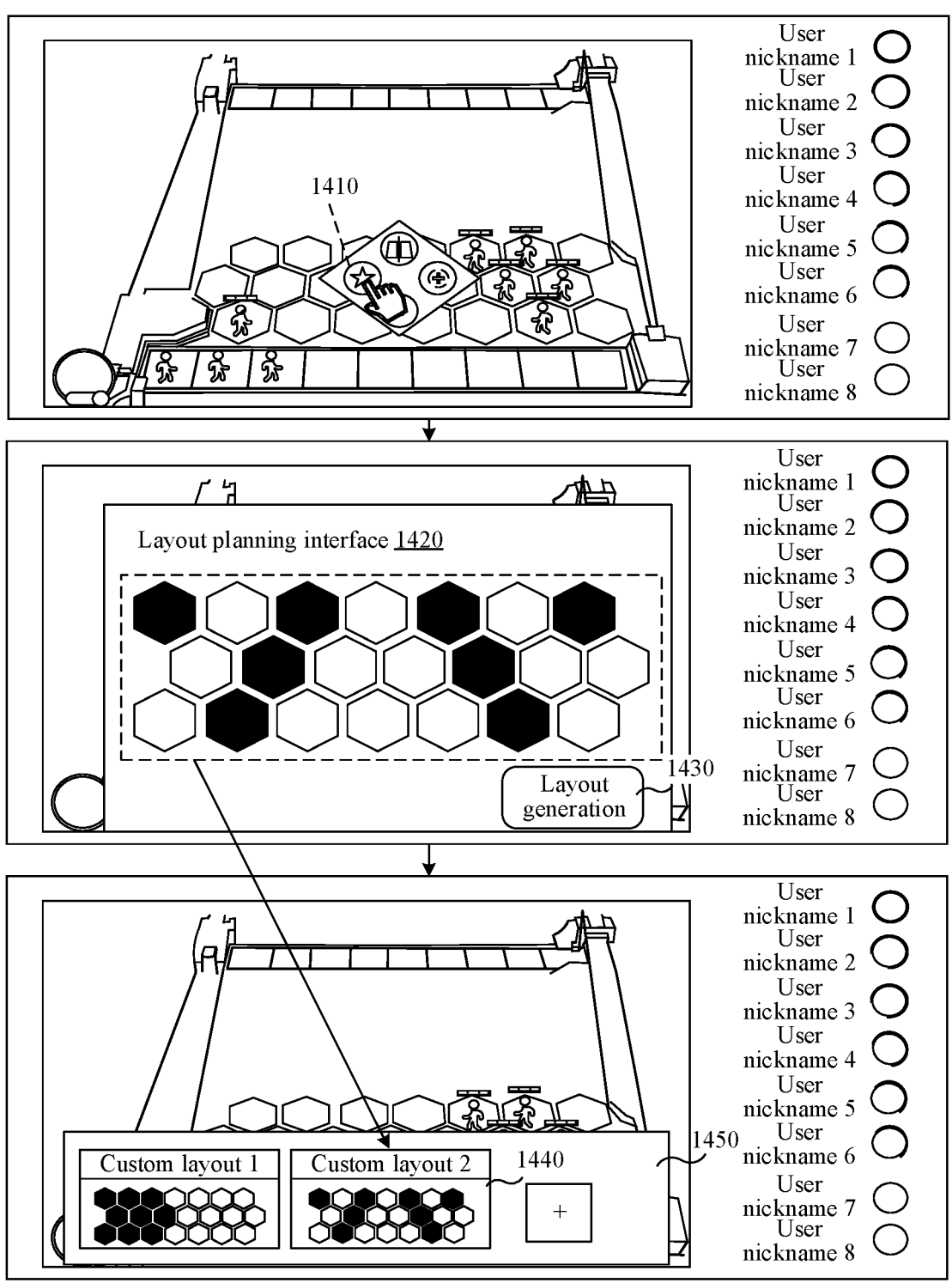
FIG. 14 shows a schematic diagram of an added station layout according to an exemplary embodiment of this application.

In some embodiments, the layout planning interface may be displayed directly after receiving the trigger operation on the second sub-control. FIG. 14 shows a schematic diagram of an added station layout according to an exemplary embodiment of this application. As shown in FIG. 14, after the user triggers a second sub-control 1410 in the station control, a layout planning interface 1420 is displayed. The layout planning interface 1420 includes all station points of the target region, such as a 3×7 battle grid. The user may select the station points in the layout planning interface to form a new station layout, determine to generate a new station layout 1440 in response to receiving a selection operation on a layout generation control 1430 displayed in the layout planning interface, and add the station layout to a layout display region 1450.

In some embodiments, a layout addition control may be displayed in the layout display region, whereby the user may re-enter the layout planning interface and add the station layout again after completing the station layout addition once.

A maximum planning quantity of stations which can be planned by the layout planning interface is equal to a maximum quantity of virtual characters that can be added in the target region of the virtual scene, or equal to a maximum quantity of virtual characters that can be added at present in the target region of the virtual scene. For example, the quantity of virtual characters that can be added to the target region of the virtual scene increases with the increase of a user level. When the user level is the highest, the maximum quantity of virtual characters that can be added to the target region of the virtual scene is 9, and the maximum quantity of virtual characters that can be added based on the current user level is 5. Then the maximum planning quantity of the layout planning interface may be set to 9 to plan a final version of station layout, or the maximum planning quantity of the layout planning interface may be set to 5 to plan a station layout suitable for the current battle.

Alternatively, in another possible implementation, the layout planning interface is displayed after receiving a touch operation of the user on the layout addition control displayed in the layout display region. That is to say, the layout display region is displayed in response to receiving the trigger operation on the second sub-control. A layout addition control is displayed in the layout display region.

The layout planning interface is displayed in response to receiving a trigger operation on the layout addition control.

In this case, a station layout may not be included in the layout display region, or a station layout may be included.

Figure 15:
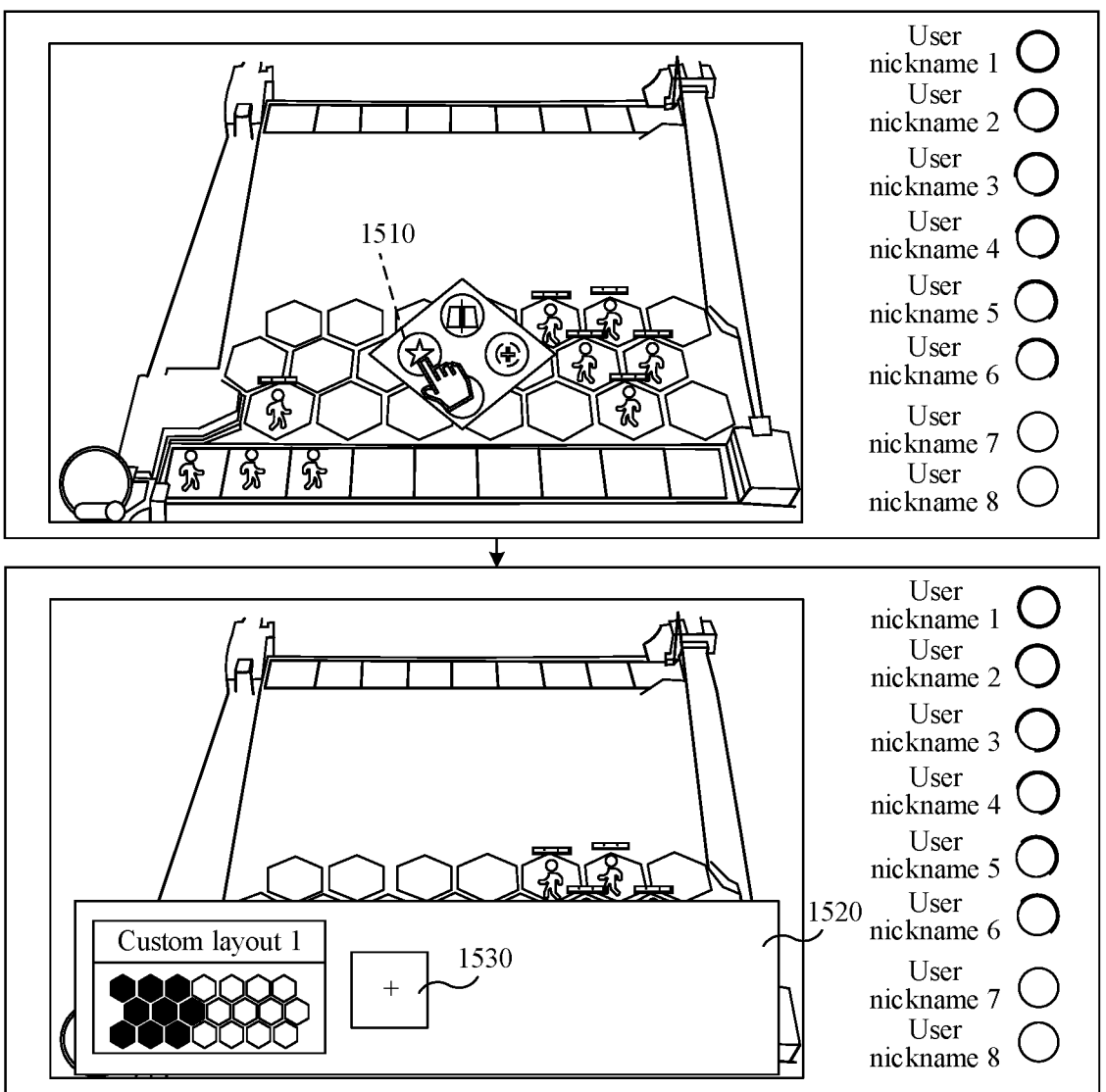
FIG. 15 shows a schematic diagram of a layout display region according to an exemplary embodiment of this application.

FIG. 15 shows a schematic diagram of a layout display region according to an exemplary embodiment of this application. As shown in FIG. 15, after the user clicks/taps a second sub-control 1510 in the station control, a layout display region 1520 is displayed. The layout display region 1520 includes a layout addition control 1530. When the user triggers the layout addition control, the layout planning interface 1420 as shown in FIG. 14 may be called to generate a new station layout based on the layout planning interface and added to the layout display region 1520.

The two modes of opening the layout planning interface may be realized by different sub-controls in at least one sub-control. For example, a fifth sub-control is configured to open the layout planning interface directly when receiving the trigger operation. A sixth sub-control is configured to open the layout display region including the layout addition control first.

In a possible implementation, the station layout displayed in the layout display region may further include a saved historical station layout based on a saving operation of the user. The historical station layout may be a station layout in the target region corresponding to the user, or a station layout in the target region corresponding to other users watched by the user when the user is in a watching mode. Schematically, a station layout saving control may be provided in the virtual scene, and is configured to record a station layout composed of stations of target virtual characters contained in a current target region when receiving a selection operation, and save the station layout in the layout display region for users to select and use in a next battle.

In a possible implementation, when changing the station of the virtual character based on the target station layout, the attack range of each virtual character may be taken as the change basis. That is to say, the process of changing the position of the target virtual character based on the target position layout may include:

obtaining an attack range of the target virtual character; and adjusting the station of the target virtual character based on the attack range of the target virtual character and the target station layout.

Schematically, virtual characters with a small attack range are in stations adjacent to the opponent battle region in the target station layout, while virtual characters with a large attack range are in stations far away from the opponent battle region in the target station layout.

Alternatively, in another possible implementation, the station of the target virtual character may be changed according to character attributes of the virtual character. The character attributes include occupation attributes, health value attributes, virtual character levels, and the like. For example, a virtual character with the occupation attribute as warrior is provided in the station adjacent to the opponent battle region in the target station layout, and a virtual character with the occupation attribute as shooter is provided in the station far away from the opponent battle region in the target station layout. Or, a virtual character with a higher upper limit of health value is provided in the station adjacent to the opponent battle region in the target station layout, and a virtual character with a lower upper limit of health value is provided in the station far away from the opponent battle region in the target station layout. Or, a virtual character with a higher virtual character level is provided in the station adjacent to the opponent battle region in the target station layout, and a virtual character with a lower virtual character level is provided in the station far away from the opponent battle region in the target station layout. The station setting basis for the virtual character provided in this embodiment of this application is only schematic, and the relevant personnel may also randomly set the station of the target virtual character, or the station setting basis may also be customized by the user. This application is not limited to the station setting basis for the virtual character.

When the quantity of stations in the target station layout set or stored by the user is greater than the quantity of virtual characters in the current target region, in a possible implementation, in response to the quantity of stations corresponding to the target station layout being greater than the quantity of the target virtual character, the station of the target virtual character is adjusted to the stations in the target station layout according to a target station order in the process of changing the station layout of the target virtual character based on the target station layout.

Schematically, the target station order may refer to an order from left to right based on the stations in the target station layout, or an order from the middle to both sides, or an order from front to back, and the like. This application is not limited to the setting mode of the target station order.

After the character selection operation triggered by the fourth sub-control, the process of performing mirror switching on the target virtual character determined by the character selection operation through the layout setting operation may be a combination of the character selection process corresponding to the first sub-control and the layout setting process corresponding to the second sub-control. Schematically, in response to receiving the trigger operation on the fourth sub-control, the selection state of at least one virtual character is adjusted to an optional state. In response to receiving a character selection operation, a virtual character selected based on the character selection operation is obtained as the target virtual character. A layout display region is displayed, at least one station layout being displayed in the layout display region. The station layout is determined based on layout settings of the user. In response to receiving a selection operation on a target station layout, the station of the target virtual character is adjusted based on the target station layout. The implementation of the above process may be similar to the character selection process corresponding to the first sub-control and the related contents in the layout setting process corresponding to the second sub-control, and will not be repeated here.

To sum up, according to the virtual character control method provided by this embodiment of this application, by providing a station control, stations of customized virtual characters can be uniformly adjusted when a computer device receives a trigger operation based on the station control, or stations of target objects can be uniformly adjusted through a self-defined adjustment mode, or the stations of the customized virtual characters can be uniformly adjusted through the self-defined adjustment mode. Thus, when a station of a virtual character in a virtual scene is adjusted, stations of a plurality of virtual characters may be collectively adjusted based on the station control, and the flexibility of station adjustment of the virtual character in the virtual scene is also ensured.

Figure 16:
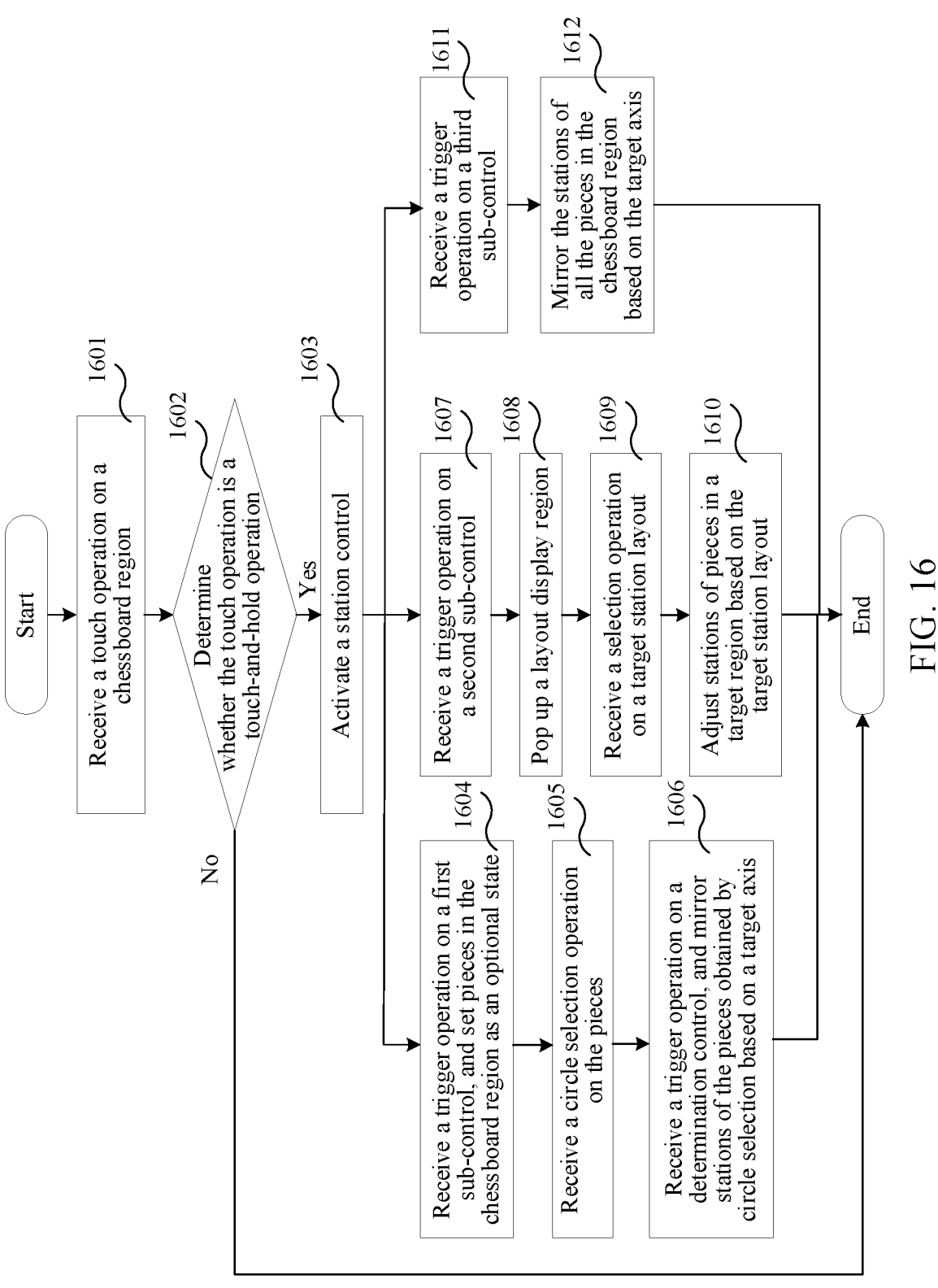
FIG. 16 shows a flowchart of a virtual character control method according to an exemplary embodiment of this application.

For example, in an auto chess scene, FIG. 16 shows a flowchart of a virtual character control method according to an exemplary embodiment of this application. The method may be performed by a computer device. The computer device may be implemented as a terminal or a server. As shown in FIG. 16, the virtual character control method includes the following steps:

S1601: Receive a touch operation on a chessboard region.

The chessboard region is a battle region corresponding to a virtual character controlled by an own party in the auto chess scene.

S1602: Determine whether the touch operation is a touch-and-hold operation, if yes, perform S1603, otherwise, end the process.

S1603: Activate a station control.

The station control includes a first sub-control, a second sub-control, and a third sub-control.

S1604: Receive a trigger operation on the first sub-control, and set pieces in the chessboard region as an optional state.

The first sub-control is one of the controls of the station control.

S1605: Receive a circle selection operation on the pieces.

S1606: Receive a trigger operation on a determination control, and mirror stations of pieces obtained by circle selection based on a target axis.

S1607: Receive a trigger operation on the second sub-control.

The second sub-control is configured to call a preset station layout.

S1608: Pop up a layout display region, at least one station layout being included in the layout display region.

S1609: Receive a selection operation on a target station layout.

The target station layout is one of the at least one station layout.

S1610: Adjust stations of pieces in a target region based on the target station layout.

S1611: Receive a trigger operation on the third sub-control.

The third sub-control is one of the controls of the station control.

S1612: Mirror the stations of all the pieces in the chessboard region based on the target axis.

To sum up, according to the virtual character control method provided by this embodiment of this application, by providing a station control, stations of customized virtual characters can be uniformly adjusted when a computer device receives a trigger operation based on the station control, or stations of target objects can be uniformly adjusted through a self-defined adjustment mode, or the stations of the customized virtual characters can be uniformly adjusted through the self-defined adjustment mode. Thus, when a station of a virtual character in a virtual scene is adjusted, stations of a plurality of virtual characters may be collectively adjusted based on the station control, and the flexibility of station adjustment of the virtual character in the virtual scene is also ensured.

Figures 17, 18:
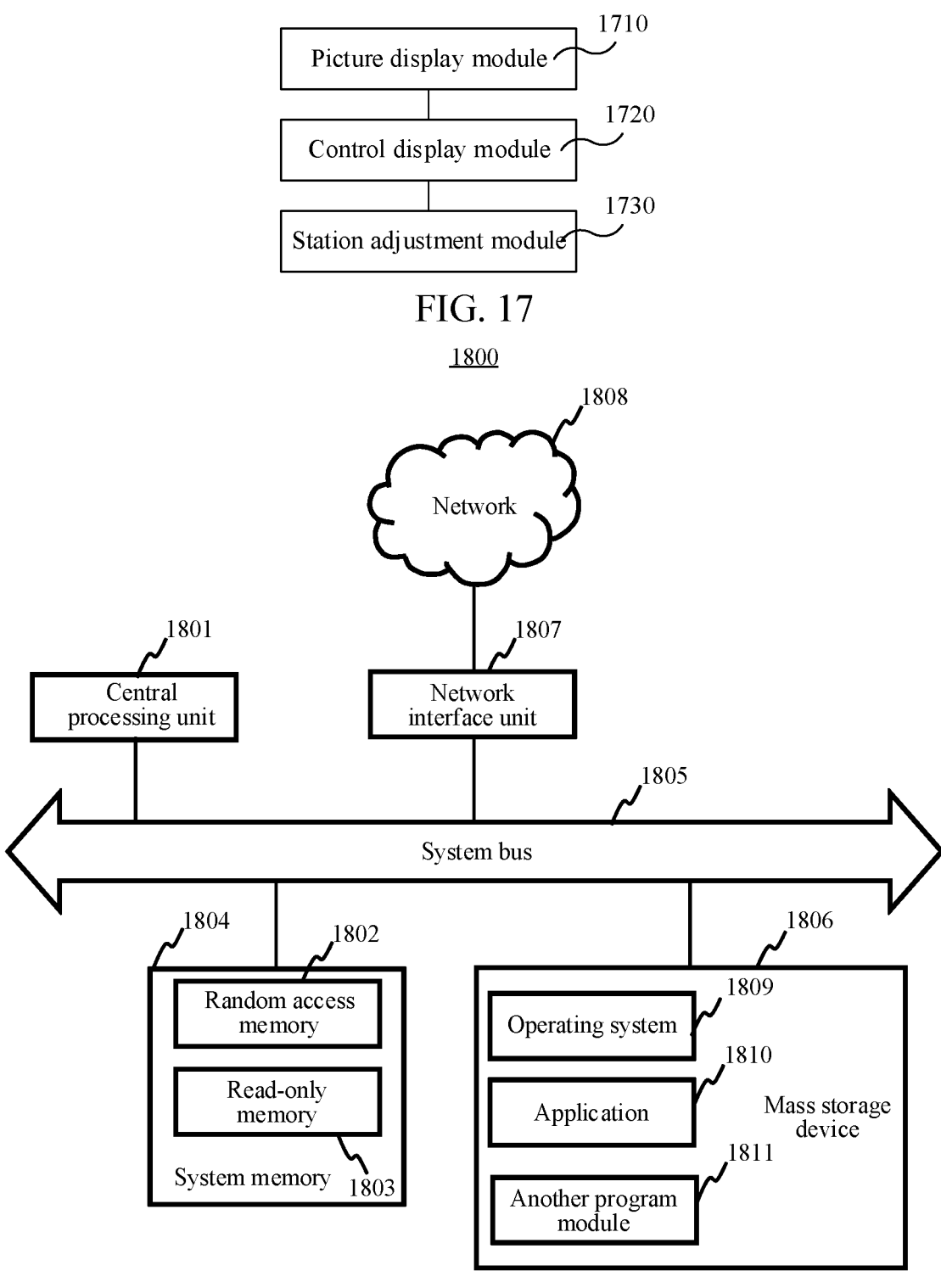
FIG. 17 shows a block diagram of a virtual character control apparatus according to an exemplary embodiment of this application.
FIG. 18 is a schematic block diagram of a computer device according to an exemplary embodiment.

FIG. 17 shows a block diagram of a virtual character control apparatus according to an exemplary embodiment of this application. As shown in FIG. 17, the virtual character control apparatus includes:

a picture display module 1710, configured to display a virtual scene, the virtual scene including at least one virtual character;

a control display module 1720, configured to superimpose and display a station control on an upper layer of the virtual scene; and a station adjustment module 1730, configured to adjust a station of a target virtual character based on a target adjustment mode in response to receiving a trigger operation on the station control. At least one of the target adjustment mode and the target virtual character is determined based on a user-customized operation. The target virtual character belongs to the at least one virtual character.

In a possible implementation, the station control includes at least two sub-controls.

The station adjustment module is configured to adjust, in response to receiving a trigger operation on a target sub-control, the station of the target virtual character based on an adjustment mode corresponding to the target sub-control. The target sub-control is any one of the at least two sub-controls.

In a possible implementation, the station adjustment module 1730 includes:

a state adjustment sub-module, configured to adjust a selection state of the at least one virtual character as an optional state in response to receiving a trigger operation on a first sub-control in the at least two sub-controls;

a character obtaining sub-module, configured to adjust a selection state of the at least one virtual character as an optional state in response to receiving a trigger operation on a first sub-control in the at least two sub-controls; and a mirror switching sub-module, configured to switch the station of the target virtual character from a first position to a second position in response to the end of the character selection operation, whereby the station of the target virtual character before and after position switching is symmetrical about a target axis.

In a possible implementation, the character selection operation includes: at least one of a continuous swipe operation based on the virtual scene, or a range selection operation based on the virtual scene, or a click/tap operation on virtual characters.

In a possible implementation, in response to the character selection operation being a continuous swipe operation based on the virtual scene, the target virtual character is a virtual character selected based on the continuous swipe operation from the at least one virtual character.

In response to the character selection operation being a range selection operation based on the virtual scene, the target virtual character is a virtual character within a range determined based on the range selection operation in the at least one virtual character.

In response to the character selection operation being a click/tap operation on virtual characters, the target virtual character is a virtual character selected based on the click/tap operation from the at least one virtual character.

In a possible implementation, in response to the character selection operation being a continuous swipe operation based on the virtual scene, a position switching sub-module is configured to switch the station of the target virtual character from the first position to the second position in response to the interruption of the continuous swipe operation based on the virtual scene.

In a possible implementation, the apparatus further includes:

a determination control display module, configured to display a determination control in response to receiving the trigger operation on the first sub-control; and the position switching sub-module, configured to switch the station of the target virtual character from the first position to the second position in response to receiving the trigger operation on the determination control.

In a possible implementation, the target axis includes a central axis of the virtual scene, or a central axis relative to the target virtual character, or any one of random axes determined based on a drawing operation of the user.

In a possible implementation, the station adjustment module 1730 includes:

a region display sub-module, configured to display a layout display region in response to receiving a trigger operation on a second sub-control in the at least two sub-controls, at least one station layout being displayed in the layout display region, and the station layout being determined based on layout settings of the user; and a station adjustment sub-module, configured to adjust, in response to receiving a selection operation on a target station layout, the station of the target virtual character based on the target station layout, the target station layout being one of the at least one station layout.

In a possible implementation, the station adjustment sub-module includes:

an attack range obtaining unit, configured to obtain an attack range of the target virtual character; and a station adjustment unit, configured to adjust the station of the target virtual character based on the attack range of the target virtual character and the target station layout.

In a possible implementation, the station adjustment sub-module is configured to adjust, in response to a quantity of stations corresponding to the target station layout being greater than a quantity of the target virtual character, the station of the target virtual character to the stations in the target station layout according to a target station order.

In a possible implementation, the apparatus further includes:

a planning interface display module, configured to display a layout planning interface;

a layout generation module, configured to generate the station layout based on stations determined in the layout planning interface; and a layout addition module, configured to add the station layout to the layout display region.

In a possible implementation, the layout display region includes a layout addition control. The planning interface display module is configured to display the layout planning interface in response to receiving a trigger operation on the layout addition control.

In a possible implementation, the control display module 1720 is configured to superimpose and display the station control on the upper layer of the virtual scene in response to receiving an activation operation.

The activation operation includes: at least one of a target operation executed on a target region in the virtual scene and a trigger operation on an activation control.

In a possible implementation, the target operation includes a touch-and-hold operation on the target region.

In a possible implementation, the station adjustment module 1730 is configured to switch the station of the at least one virtual character from the first position to the second position in response to receiving the trigger operation on a third sub-control in the at least two sub-controls, whereby the station of the at least one virtual character before and after position switching is symmetrical about a target axis.

To sum up, according to the virtual character control apparatus provided by this embodiment of this application, by providing a station control, stations of customized virtual characters can be uniformly adjusted when a computer device receives a trigger operation based on the station control, or stations of target objects can be uniformly adjusted through a self-defined adjustment mode, or the stations of the customized virtual characters can be uniformly adjusted through the self-defined adjustment mode. Thus, when a station of a virtual character in a virtual scene is adjusted, stations of a plurality of virtual characters may be collectively adjusted based on the station control, and the flexibility of station adjustment of the virtual character in the virtual scene is also ensured.

FIG. 18 shows a structural block diagram of a computer device 1800 according to an exemplary embodiment of this application. The computer device may be implemented as a server in the foregoing solution of this application. The computer device 1800 includes a central processing unit (CPU) 1801, a system memory 1804 including a random access memory (RAM) 1802 and a read-only memory (ROM) 1803, and a system bus 1805 connecting the system memory 1804 and the CPU 1801. The computer device 1800 further includes a mass storage device 1806 configured to store an operating system 1809, an application 1810, and another program module 1811.

The mass storage device 1806 is connected to the central processing unit 1801 through a mass storage controller (not shown) connected to the system bus 1805. The mass storage device 1806 and a computer-readable medium associated therewith provide non-volatile storage for the computer device 1800. That is to say, the mass storage device 1806 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read only memory (EPROM), an electrically-erasable programmable read-only memory (EEPROM), a flash memory or another solid-state memory technology, a CD-ROM, a digital versatile disc (DVD) or another optical memory, a tape cartridge, a magnetic tape, a magnetic disk memory, or another magnetic storage device. Certainly, a person skilled in the art may learn that the computer storage medium is not limited to the foregoing several types. The foregoing system memory 1804 and mass storage device 1806 may be collectively referred to as a memory.

According to various embodiments of the present disclosure, the computer device 1800 may also operate through a remote computer connected to a network through, for example, the Internet. That is, the computer device 1800 may be connected to a network 1808 through a network interface unit 1807 which is connected to the system bus 1805, or may be connected to another type of network or remote computer system (not shown) by using the network interface unit 1807.

The memory further includes at least one computer program. The at least one computer program is stored in the memory. The CPU 1801 implements all or some of the steps of the virtual character control method shown in the various embodiments by executing the at least one computer program.

Figure 19:
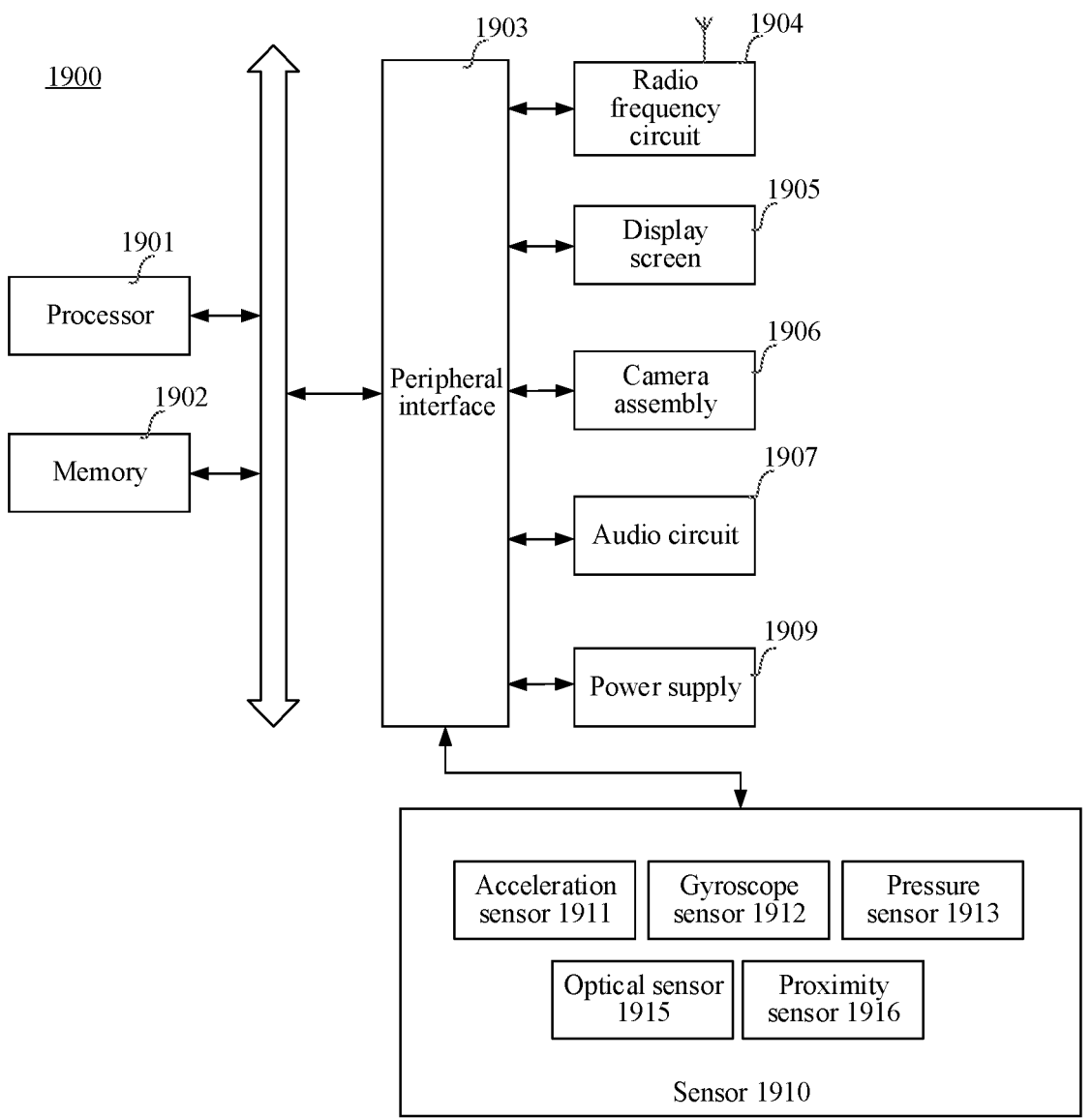
FIG. 19 is a schematic block diagram of a computer device according to an exemplary embodiment.

FIG. 19 shows a structural block diagram of a computer device 1900 according to an exemplary embodiment of this application. The computer device 1900 may be implemented as the foregoing terminal, for example, smartphones, tablet personal computers, laptop computers, or desktop computers. The computer device 1900 may also be referred to as another name such as a user equipment, a portable terminal, a laptop terminal, or a desktop terminal.

Generally, the computer device 1900 includes: a processor 1901 and a memory 1902.

The processor 1901 may include one or more processing cores, for example, a 4-core processor or a 19-core processor. The processor 1901 may be implemented in at least one hardware form of a digital signal processor (DSP), a field-programmable gate array (FPGA), and a programmable logic array (PLA). The processor 1901 may further include a main processor and a co-processor. The main processor is a processor for processing data in a wake-up status, and is also referred to as a CPU. The co-processor is a low-power processor for processing data in a standby status. In some embodiments, the processor 1901 may be integrated with a graphics processing unit (GPU). The GPU is responsible for rendering and drawing content to be displayed by a display screen. In some embodiments, the processor 1901 may further include an AI processor. The AI processor is configured to process computing operations related to machine learning.

The memory 1902 may include one or more computer-readable storage media. The computer-readable storage medium may be non-transient. The memory 1902 may further include a high-speed random access memory and a nonvolatile memory, for example, one or more disk storage devices or flash storage devices. In some embodiments, the non-transitory computer-readable storage medium in the memory 1902 is configured to store at least one computer program. The at least one computer program is used for execution by the processor 1901 to implement all or some of the steps of the virtual character control method provided by the method embodiments in this application.

In some embodiments, the computer device 1900 further includes: a peripheral interface 1903 and at least one peripheral. The processor 1901, the memory 1902, and the peripheral interface 1903 may be connected through a bus or a signal cable. Each peripheral may be connected to the peripheral interface 1903 through a bus, a signal cable, or a circuit board. Specifically, the peripheral includes: at least one of a radio frequency circuit 1904, a display screen 1905, a camera assembly 1906, an audio circuit 1907, and a power supply 1909.

In some embodiments, the computer device 1900 further includes one or more sensors 1910. The one or more sensors 1910 include, but are not limited to, an acceleration sensor 1911, a gyroscope sensor 1912, a pressure sensor 1913, an optical sensor 1915, and a proximity sensor 1916.

It is to be understood by a person skilled in the art that the structure shown in FIG. 19 is not limiting of the computer device 1900 and may include more or fewer assemblies than illustrated, or some assemblies may be combined, or different assembly arrangements may be employed.

In an exemplary embodiment, a non-transitory computer-readable storage medium is further provided for storing at least one computer program. The at least one computer program is loaded and executed by a processor to implement all or some of the steps of the foregoing virtual character control method. For example, the computer-readable storage medium may be a ROM, a RAM, a CD-ROM, a magnetic tape, a floppy disk, an optical data storage device, or the like.

In an exemplary embodiment, a computer program product or a computer program is further provided. The computer program product or the computer program includes at least one computer program. The at least one computer program is stored in a non-transitory computer-readable storage medium. A processor of a computer device reads computer instructions from the computer-readable storage medium. The processor executes the at least one computer program, whereby the computer device performs all or some of the steps of the method shown in any embodiment of FIG. 5, FIG. 7, or FIG. 16.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

What is claimed is:

1. A virtual character control method performed by a computer device, the method comprising:

displaying a virtual scene on a display, the virtual scene comprising at least one virtual character;

in response to receiving a target operation on a target region in the virtual scene by a user of the computer device, displaying a station control in the virtual scene;

in response to displaying the station control, generating a plurality of sub-controls within the station control, each sub-control configured to adjust a unique positional arrangement of the at least one virtual character by deploying the at least one virtual character in the virtual scene;

receiving a trigger operation on the station control to select a respective sub-control of the plurality of sub-controls by the user of the computer device; and in response to receiving the trigger operation on the station control, adjusting a station of the at least one virtual character based on a target adjustment mode corresponding to the respective sub-control, at least one of the target adjustment mode and the at least one virtual character being determined based on a user-customized operation of the station control, further including:

receiving a first trigger operation on the station control to select a virtual character selection sub-control of the plurality of sub-controls by the user of the computer device;

in response to the trigger operation to select the virtual character selection sub-control:

detecting a range selection operation by the user of the computer device on the virtual scene; and drawing a contour line surrounding the at least one virtual character in the virtual scene according to the range selection operation;

receiving a second trigger operation on the station control to select a mirror line selection sub-control of the plurality of sub-controls by the user of the computer device;

in response to the trigger operation to select the mirror line selection sub-control:

detecting a mirror line drawing operation by the user of the computer device on the virtual scene;

drawing a straight line in the virtual scene according to the range selection operation as a mirror line such that the contour line surrounding the at least one virtual character in the virtual scene is located on a first side of the mirror line; and mirror switching each of the at least one virtual character surrounded by the contour line from an old position in the virtual scene on the first side of the mirror line to a new position on a second side of the mirror line, wherein the new position is mirror symmetric to the old position relative to the mirror line.

2. The method according to claim 1, wherein the station control comprises at least two sub-controls; and the adjusting a station of the at least one virtual character based on a target adjustment mode comprises:

in response to receiving a respective trigger operation on a target sub-control, adjusting the station of the at least one virtual character based on an adjustment mode corresponding to the target sub-control, the target sub-control being one of the at least two sub-controls.

3. The method according to claim 2, wherein the adjusting the station of the at least one virtual character based on an adjustment mode corresponding to the target sub-control comprises:

adjusting a selection state of the at least one virtual character as an optional state in response to receiving a first respective trigger operation on a first sub-control in the at least two sub-controls;

in response to receiving a character selection operation, obtaining a virtual character selected based on the character selection operation as the at least one virtual character; and switching the station of the at least one virtual character from a first position to a second position in response to the character selection operation, whereby the station of a target virtual character before and after the position switching is symmetrical about a target axis of the virtual scene.

4. The method according to claim 2, wherein the adjusting the station of the at least one virtual character based on an adjustment mode corresponding to the target sub-control comprises:

displaying a layout display region in response to receiving a second respective trigger operation on a second sub-control in the at least two sub-controls, the layout display region including at least one station layout determined based on user-defined layout settings; and in response to receiving a selection operation on a target station layout, adjusting the station of the at least one virtual character based on the target station layout, the target station layout being one of the at least one station layout.

5. The method according to claim 4, wherein the adjusting the station of the at least one virtual character based on the target station layout comprises:

obtaining an attack range of the at least one virtual character; and adjusting the station of the at least one virtual character based on the attack range of the at least one virtual character and the target station layout.

6. The method according to claim 4, wherein the adjusting the station of the at least one virtual character based on the target station layout comprises:

in response to a quantity of stations corresponding to the target station layout being greater than a quantity of a target virtual character, adjusting the station of the at least one virtual character to the stations in the target station layout according to a target station order.

7. The method according to claim 1, wherein the station control is superimposed on an upper layer of the virtual scene.

8. A computer device, comprising a processor and a memory, the memory storing at least one computer program, and the at least one computer program, when loaded and executed by the processor, causing the computer device to implement a virtual character control method including:

displaying a virtual scene on a display of the computer device, the virtual scene comprising at least one virtual character;

in response to receiving a target operation on a target region in the virtual scene by a user of the computer device, displaying a station control in the virtual scene;

in response to displaying the station control, generating a plurality of sub-controls within the station control, each sub-control configured to adjust a unique positional arrangement of the at least one virtual character by deploying the at least one virtual character in the virtual scene;

receiving a trigger operation on the station control to select a respective sub-control of the plurality of sub-controls by the user of the computer device; and in response to receiving the trigger operation on the station control, adjusting a station of the at least one virtual character based on a target adjustment mode corresponding to the respective sub-control, at least one of the target adjustment mode and the at least one virtual character being determined based on a user-customized operation of the station control, further including:

receiving a first trigger operation on the station control to select a virtual character selection sub-control of the plurality of sub-controls by the user of the computer device;

in response to the trigger operation to select the virtual character selection sub-control:

detecting a range selection operation by the user of the computer device on the virtual scene; and drawing a contour line surrounding the at least one virtual character in the virtual scene according to the range selection operation;

receiving a second trigger operation on the station control to select a mirror line selection sub-control of the plurality of sub-controls by the user of the computer device;

in response to the trigger operation to select the mirror line selection sub-control:

detecting a mirror line drawing operation by the user of the computer device on the virtual scene;

drawing a straight line in the virtual scene according to the range selection operation as a mirror line such that the contour line surrounding the at least one virtual character in the virtual scene is located on a first side of the mirror line; and mirror switching each of the at least one virtual character surrounded by the contour line from an old position in the virtual scene on the first side of the mirror line to a new position on a second side of the mirror line, wherein the new position is mirror symmetric to the old position relative to the mirror line.

9. The computer device according to claim 8, wherein the station control comprises at least two sub-controls; and the adjusting a station of the at least one virtual character based on a target adjustment mode comprises:

in response to receiving a respective trigger operation on a target sub-control, adjusting the station of the at least one virtual character based on an adjustment mode corresponding to the target sub-control, the target sub-control being one of the at least two sub-controls.

10. The computer device according to claim 9, wherein the adjusting the station of the at least one virtual character based on an adjustment mode corresponding to the target sub-control comprises:

adjusting a selection state of the at least one virtual character as an optional state in response to receiving a first respective trigger operation on a first sub-control in the at least two sub-controls;

in response to receiving a character selection operation, obtaining a virtual character selected based on the character selection operation as the at least one virtual character; and switching the station of the at least one virtual character from a first position to a second position in response to the character selection operation, whereby the station of a target virtual character before and after the position switching is symmetrical about a target axis of the virtual scene.

11. The computer device according to claim 9, wherein the adjusting the station of the at least one virtual character based on an adjustment mode corresponding to the target sub-control comprises:

displaying a layout display region in response to receiving a second respective trigger operation on a second sub-control in the at least two sub-controls, the layout display region including at least one station layout determined based on user-defined layout settings; and in response to receiving a selection operation on a target station layout, adjusting the station of the at least one virtual character based on the target station layout, the target station layout being one of the at least one station layout.

12. The computer device according to claim 11, wherein the adjusting the station of the at least one virtual character based on the target station layout comprises:

obtaining an attack range of the at least one virtual character; and adjusting the station of the at least one virtual character based on the attack range of the at least one virtual character and the target station layout.

13. The computer device according to claim 11, wherein the adjusting the station of the at least one virtual character based on the target station layout comprises:

in response to a quantity of stations corresponding to the target station layout being greater than a quantity of a target virtual character, adjusting the station of the at least one virtual character to the stations in the target station layout according to a target station order.

14. The computer device according to claim 8, wherein the station control is superimposed on an upper layer of the virtual scene.

15. A non-transitory computer-readable storage medium, storing at least one computer program, and the computer program, when loaded and executed by a processor of a computer device, causing the computer device to implement a virtual character control method including:

displaying a virtual scene on a display of the computer device, the virtual scene comprising at least one virtual character;

in response to receiving a target operation on a target region in the virtual scene by a user of the computer device, displaying a station control in the virtual scene;

in response to displaying the station control, generating a plurality of sub-controls within the station control, each sub-control configured to adjust a unique positional arrangement of the at least one virtual character by deploying the at least one virtual character in the virtual scene;

receiving a trigger operation on the station control to select a respective sub-control of the plurality of sub-controls by the user of the computer device; and in response to receiving the trigger operation on the station control, adjusting a station of the at least one virtual character based on a target adjustment mode corresponding to the respective sub-control, at least one of the target adjustment mode and the at least one virtual character being determined based on a user-customized operation of the station control, further including:

receiving a first trigger operation on the station control to select a virtual character selection sub-control of the plurality of sub-controls by the user of the computer device:

in response to the trigger operation to select the virtual character selection sub-control:

detecting a range selection operation by the user of the computer device on the virtual scene; and drawing a contour line surrounding the at least one virtual character in the virtual scene according to the range selection operation;

receiving a second trigger operation on the station control to select a mirror line selection sub-control of the plurality of sub-controls by the user of the computer device;

in response to the trigger operation to select the mirror line selection sub-control:

detecting a mirror line drawing operation by the user of the computer device on the virtual scene;

drawing a straight line in the virtual scene according to the range selection operation as a mirror line such that the contour line surrounding the at least one virtual character in the virtual scene is located on a first side of the mirror line; and mirror switching each of the at least one virtual character surrounded by the contour line from an old position in the virtual scene on the first side of the mirror line to a new position on a second side of the mirror line, wherein the new position is mirror symmetric to the old position relative to the mirror line.

16. The non-transitory computer-readable storage medium according to claim 15, wherein the station control comprises at least two sub-controls; and the adjusting a station of the at least one virtual character based on a target adjustment mode comprises:

in response to receiving a respective trigger operation on a target sub-control, adjusting the station of the at least one virtual character based on an adjustment mode corresponding to the target sub-control, the target sub-control being one of the at least two sub-controls.

17. The non-transitory computer-readable storage medium according to claim 16, wherein the adjusting the station of the at least one virtual character based on an adjustment mode corresponding to the target sub-control comprises:

adjusting a selection state of the at least one virtual character as an optional state in response to receiving a first respective trigger operation on a first sub-control in the at least two sub-controls;

in response to receiving a character selection operation, obtaining a virtual character selected based on the character selection operation as the at least one virtual character; and switching the station of the at least one virtual character from a first position to a second position in response to the character selection operation, whereby the station of a target virtual character before and after the position switching is symmetrical about a target axis of the virtual scene.

18. The non-transitory computer-readable storage medium according to claim 16, wherein the adjusting the station of the at least one virtual character based on an adjustment mode corresponding to the target sub-control comprises:

displaying a layout display region in response to receiving a second respective trigger operation on a second sub-control in the at least two sub-controls, the layout display region including at least one station layout determined based on user-defined layout settings; and in response to receiving a selection operation on a target station layout, adjusting the station of the at least one virtual character based on the target station layout, the target station layout being one of the at least one station layout.

19. The non-transitory computer-readable storage medium according to claim 18, wherein the adjusting the station of the at least one virtual character based on the target station layout comprises:

obtaining an attack range of the at least one virtual character; and adjusting the station of the at least one virtual character based on the attack range of the at least one virtual character and the target station layout.

20. The non-transitory computer-readable storage medium according to claim 18, wherein the adjusting the station of the at least one virtual character based on the target station layout comprises:

in response to a quantity of stations corresponding to the target station layout being greater than a quantity of a target virtual character, adjusting the station of the at least one virtual character to the stations in the target station layout according to a target station order.

* * * * *